US012701075B2

(12) United States Patent
Xiao et al.

(10) Patent No.: US 12,701,075 B2
(45) Date of Patent: Aug. 4, 2026

(54) PACKET SENDING METHOD, DEVICE, AND SYSTEM

(71) Applicant: HUAWEI TECHNOLOGIES CO., LTD., Shenzhen (CN)

(72) Inventors: Yaqun Xiao, Beijing (CN); Huizhi Wen, Beijing (CN); Chuang Chen, Beijing (CN); Rui Gu, Beijing (CN); Jun Qiu, Shenzhen (CN); Zhibo Hu, Beijing (CN); Ting Liao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 575 days.

(21) Appl. No.: 17/890,710

(22) Filed: Aug. 18, 2022

(65) Prior Publication Data

US 2023/0095244 A1 Mar. 30, 2023

Related U.S. Application Data

(63) Continuation of application No. PCT/CN2020/117006, filed on Sep. 23, 2020.

(30) Foreign Application Priority Data

Feb. 21, 2020 (CN) .......................... 202010106211.9
Apr. 15, 2020 (CN) .......................... 202010295809.7

(Continued)

(51) Int. Cl.
*H04L 45/00* (2022.01)
*H04L 45/02* (2022.01)

(Continued)

(52) U.S. Cl.
CPC .............. *H04L 45/22* (2013.01); *H04L 45/02* (2013.01); *H04L 45/12* (2013.01); *H04L 45/247* (2022.05);

(Continued)

(58) Field of Classification Search
CPC ......... H04L 45/22; H04L 45/02; H04L 45/12; H04L 45/247; H04L 45/26; H04L 45/28;

(Continued)

(56) References Cited

U.S. PATENT DOCUMENTS 9,014,006 B2 * 4/2015 Haramaty ............. H04L 47/122
370/237
9,106,566 B2 * 8/2015 Xie .......................... H04L 45/28

(Continued)

FOREIGN PATENT DOCUMENTS

CN 101599898 A 12/2009
CN 104426771 A 3/2015

(Continued)

OTHER PUBLICATIONS

C. Filsfils, Ed. et al, SRv6 NET-PGM extension: Insertion, draft-filsfils-spring-srv6-net-pgm-insertion-02, Spring Internet-Draft, Jan. 15, 2020, 12 pages.

(Continued)

*Primary Examiner* — Redentor Pasia
(74) *Attorney, Agent, or Firm* — WOMBLE BOND DICKINSON (US) LLP

(57) ABSTRACT

Embodiments of this application disclose a packet sending method, a device, and a system, so that a specified network device does not use a backup forwarding path to forward a packet, thereby reducing, to some extent, a technical problem such as network resource waste or network congestion caused by a loop problem. The method includes: A first network device obtains a first packet destined for a destination device; the first network device adds a first indication identifier to the first packet to generate a second packet, where the first indication identifier is used to indicate a second network device to avoid using a backup forwarding path from the second network device to the destination (Continued)

device to send the second packet to the destination device; and the first network device sends the second packet to the second network device by using a first forwarding path.

30 Claims, 22 Drawing Sheets

(30) Foreign Application Priority Data

May 29, 2020  (CN) .......................... 202010478986.9
Jul. 22, 2020  (CN) .......................... 202010711897.4

(51) Int. Cl.
    *H04L 45/12*          (2022.01)
    *H04L 45/247*         (2022.01)
    *H04L 45/28*          (2022.01)
    *H04L 45/74*          (2022.01)
    *H04L 45/741*         (2022.01)
(52) U.S. Cl.
    CPC .............. *H04L 45/26* (2013.01); *H04L 45/28*
                (2013.01); *H04L 45/74* (2013.01); *H04L*
                                        *45/741* (2013.01)
(58) Field of Classification Search
    CPC ....... H04L 45/74; H04L 45/741; H04L 45/34;
                H04L 45/50; H04L 45/54; H04L 45/18;
                                            H04L 45/655
    See application file for complete search history.

(56) References Cited

U.S. PATENT DOCUMENTS

| | | | | |
|---|---|---|---|---|
| 10,841,220 | B1 | 11/2020 | Filsfils et al. | |
| 12,224,938 | B2 * | 2/2025 | Sharma | H04L 47/122 |
| 2006/0126496 | A1 | 6/2006 | Filsfils et al. | |
| 2007/0091796 | A1 | 4/2007 | Filsfils et al. | |
| 2009/0245259 | A1 | 10/2009 | Filsfils et al. | |
| 2014/0269727 | A1 * | 9/2014 | Filsfils | H04L 45/54 |
| | | | | 370/392 |
| 2015/0109902 | A1 * | 4/2015 | Kumar | H04L 41/0668 |
| | | | | 370/219 |
| 2016/0014013 | A1 * | 1/2016 | Zhang | H04L 45/021 |
| | | | | 370/225 |
| 2016/0173366 | A1 | 6/2016 | Saad et al. | |
| 2017/0054626 | A1 | 2/2017 | Sivabalan et al. | |
| 2017/0054630 | A1 * | 2/2017 | Liang | H04L 45/64 |
| 2018/0351863 | A1 | 12/2018 | Vairavakkalai et al. | |
| 2018/0351864 | A1 | 12/2018 | Jeganathan et al. | |
| 2019/0007372 | A1 | 1/2019 | Bhat et al. | |
| 2021/0029022 | A1 | 1/2021 | Hu | |
| 2021/0036951 | A1 * | 2/2021 | Heron | H04L 45/04 |
| 2021/0092053 | A1 | 3/2021 | Filsfils et al. | |
| 2021/0099382 | A1 * | 4/2021 | Liu | H04L 45/741 |
| 2022/0408254 | A1 * | 12/2022 | Wright | G06F 8/65 |
| 2023/0043743 | A1 | 2/2023 | Psenak et al. | |
| 2024/0235986 | A1 * | 7/2024 | Qin | H04L 45/34 |

FOREIGN PATENT DOCUMENTS

| | | |
|---|---|---|
| CN | 104579942 A | 4/2015 |
| CN | 106559324 A | 4/2017 |
| CN | 107864091 A | 3/2018 |
| CN | 107872332 A | 4/2018 |
| CN | 108390828 A | 8/2018 |
| CN | 109561021 A | 4/2019 |
| CN | 109981458 A | 7/2019 |
| CN | 110113259 A | 8/2019 |
| CN | 110324165 A | 10/2019 |
| CN | 110535782 A | 12/2019 |
| CN | 110572326 A | 12/2019 |
| CN | 110677345 A | 1/2020 |
| CN | 110752993 A | 2/2020 |
| EP | 3920480 A1 | 12/2021 |
| JP | 2012195627 A | 10/2012 |
| JP | 2016092756 A | 5/2016 |
| JP | 2016149634 A | 8/2016 |
| WO | 2016050031 A1 | 4/2016 |
| WO | 2019196653 A1 | 10/2019 |
| WO | 2020024828 A1 | 2/2020 |

OTHER PUBLICATIONS

C. Filsfils, Ed. et al, SRv6 Network Programming, draft-ietf-spring-srv6-network-programming-15, Spring Internet-Draft, Mar. 27, 2020, 39 pages.
Request for Comments: 4915, P. Psenak et al, Multi-Topology (MT) Routing in OSPF, Network Working Group, Jun. 2007, 20 pages.
RFC 8665, P. Psenak, Ed. et al, OSPF Extensions for Segment Routing, Internet Engineering Task Force (IETF), Dec. 2019, 25 pages.
RFC 8667, S. Previdi, Ed. et al, IS-IS Extensions for Segment Routing, Internet Engineering Task Force (IETF), Dec. 2019, 28 pages.

* cited by examiner

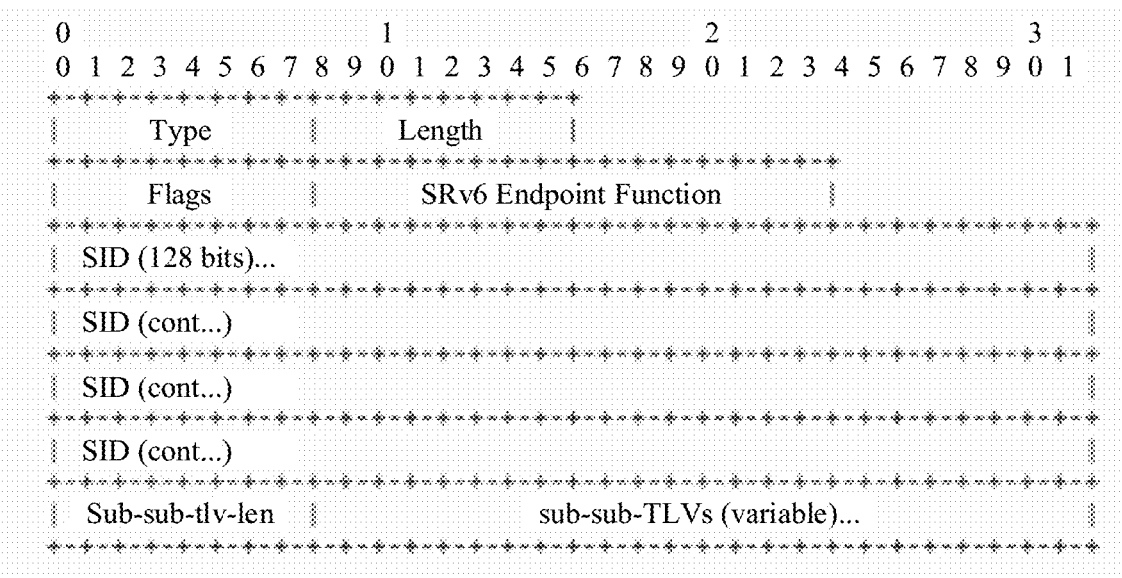

FIG. 6

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type             |             Length            |
+-+-+-+-+-+-+-+-+-+-+-+-+-+-+-+-+-+-+-+-+-+-+-+-+-+-+-+-+-+-+-+-+
|    Flags      |   Reserved    |       Endpoint Behavior       |
+-+-+-+-+-+-+-+-+-+-+-+-+-+-+-+-+-+-+-+-+-+-+-+-+-+-+-+-+-+-+-+-+
|   SID (128 bits)...                                           |
+-+-+-+-+-+-+-+-+-+-+-+-+-+-+-+-+-+-+-+-+-+-+-+-+-+-+-+-+-+-+-+-+
|   SID cont...                                                 |
+-+-+-+-+-+-+-+-+-+-+-+-+-+-+-+-+-+-+-+-+-+-+-+-+-+-+-+-+-+-+-+-+
|   SID cont...                                                 |
+-+-+-+-+-+-+-+-+-+-+-+-+-+-+-+-+-+-+-+-+-+-+-+-+-+-+-+-+-+-+-+-+
|   SID cont...                                                 |
+-+-+-+-+-+-+-+-+-+-+-+-+-+-+-+-+-+-+-+-+-+-+-+-+-+-+-+-+-+-+-+-+
|   Sub-TLVs (variable)...                                      |
+-+-+-+-+-+-+-+-+-+-+-+-+-+-+-+-+
```

FIG. 7

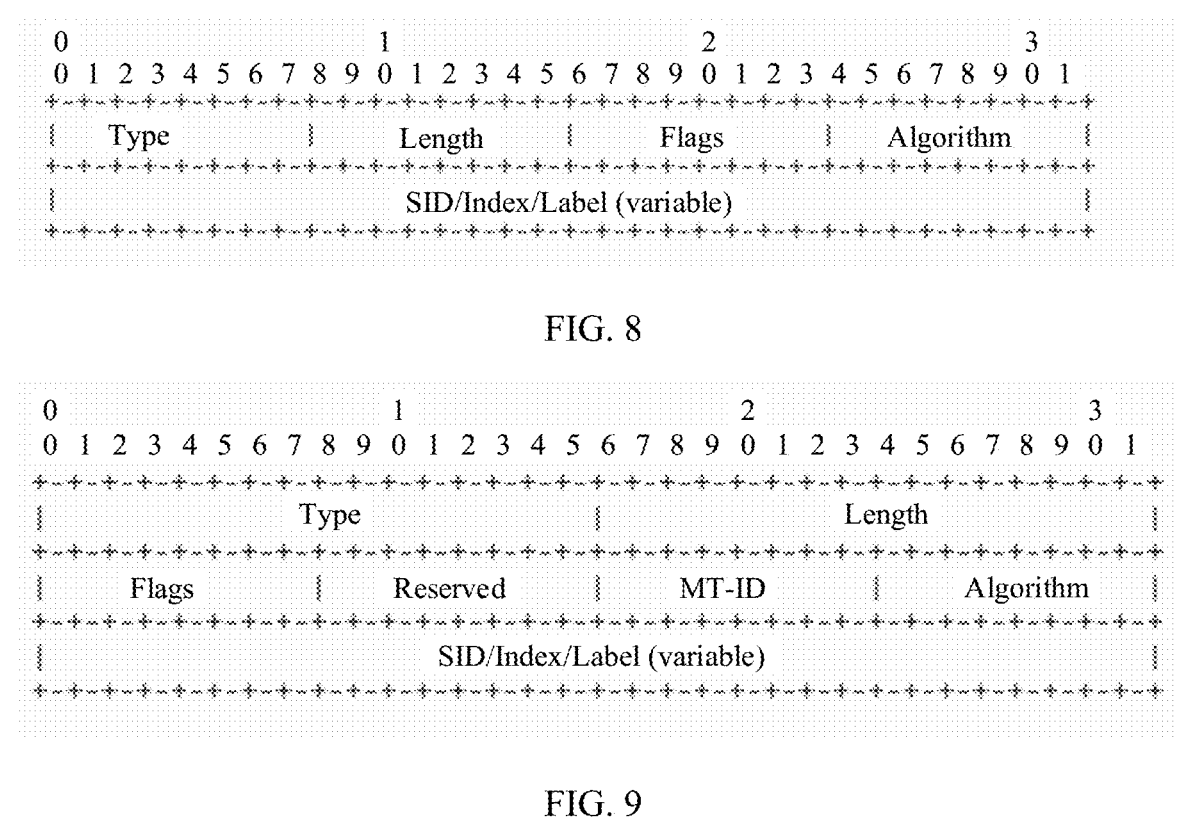

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Type        |      Length     |     Flags     |   Algorithm   |
+-+-+-+-+-+-+-+-+-+-+-+-+-+-+-+-+-+-+-+-+-+-+-+-+-+-+-+-+-+-+-+-+
|                   SID/Index/Label (variable)                   |
+-+-+-+-+-+-+-+-+-+-+-+-+-+-+-+-+-+-+-+-+-+-+-+-+-+-+-+-+-+-+-+-+
```

FIG. 8

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|              Type              |              Length            |
+-+-+-+-+-+-+-+-+-+-+-+-+-+-+-+-+-+-+-+-+-+-+-+-+-+-+-+-+-+-+-+-+
|    Flags      |    Reserved    |    MT-ID       |   Algorithm    |
+-+-+-+-+-+-+-+-+-+-+-+-+-+-+-+-+-+-+-+-+-+-+-+-+-+-+-+-+-+-+-+-+
|                   SID/Index/Label (variable)                   |
+-+-+-+-+-+-+-+-+-+-+-+-+-+-+-+-+-+-+-+-+-+-+-+-+-+-+-+-+-+-+-+-+
```

FIG. 9

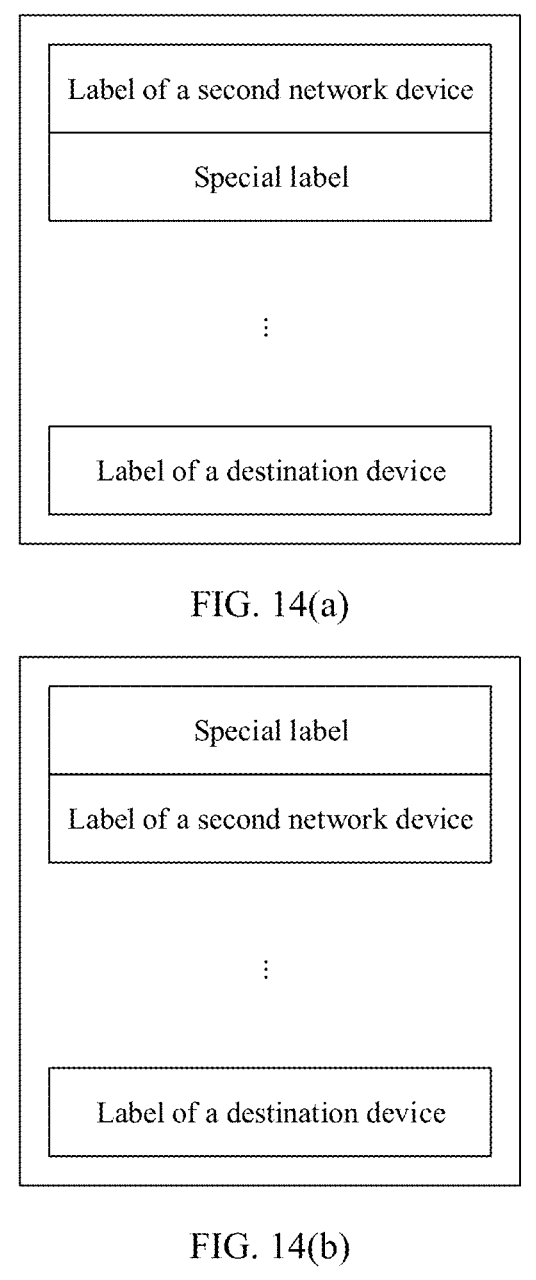

Label of a second network device

Special label

⋮

Label of a destination device

FIG. 14(a)

Special label

Label of a second network device

⋮

Label of a destination device

FIG. 14(b)

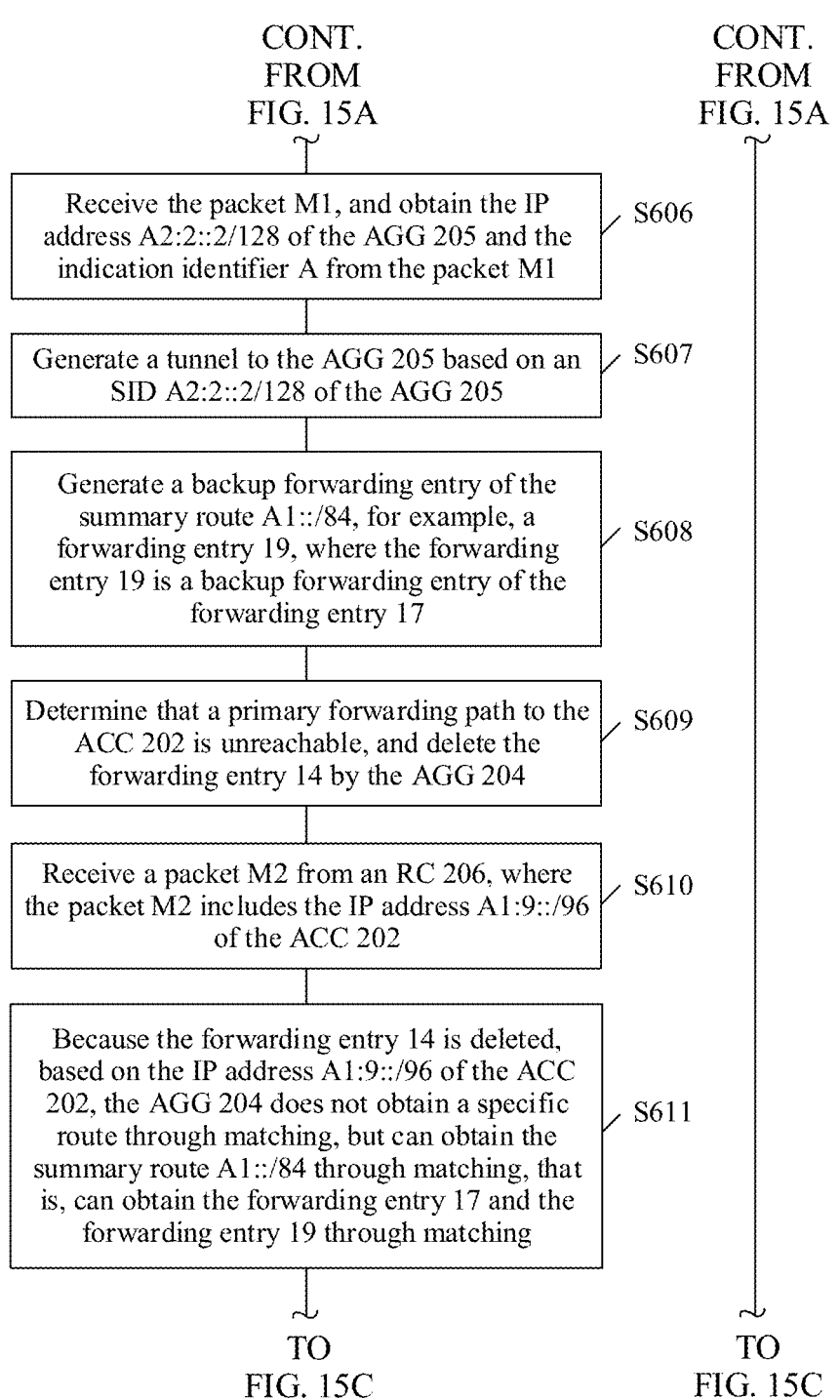

CONT.
FROM
FIG. 15A

CONT.
FROM
FIG. 15A

Receive the packet M1, and obtain the IP address A2:2::2/128 of the AGG 205 and the indication identifier A from the packet M1 — S606

Generate a tunnel to the AGG 205 based on an SID A2:2::2/128 of the AGG 205 — S607

Generate a backup forwarding entry of the summary route A1::/84, for example, a forwarding entry 19, where the forwarding entry 19 is a backup forwarding entry of the forwarding entry 17 — S608

Determine that a primary forwarding path to the ACC 202 is unreachable, and delete the forwarding entry 14 by the AGG 204 — S609

Receive a packet M2 from an RC 206, where the packet M2 includes the IP address A1:9::/96 of the ACC 202 — S610

Because the forwarding entry 14 is deleted, based on the IP address A1:9::/96 of the ACC 202, the AGG 204 does not obtain a specific route through matching, but can obtain the summary route A1::/84 through matching, that is, can obtain the forwarding entry 17 and the forwarding entry 19 through matching — S611

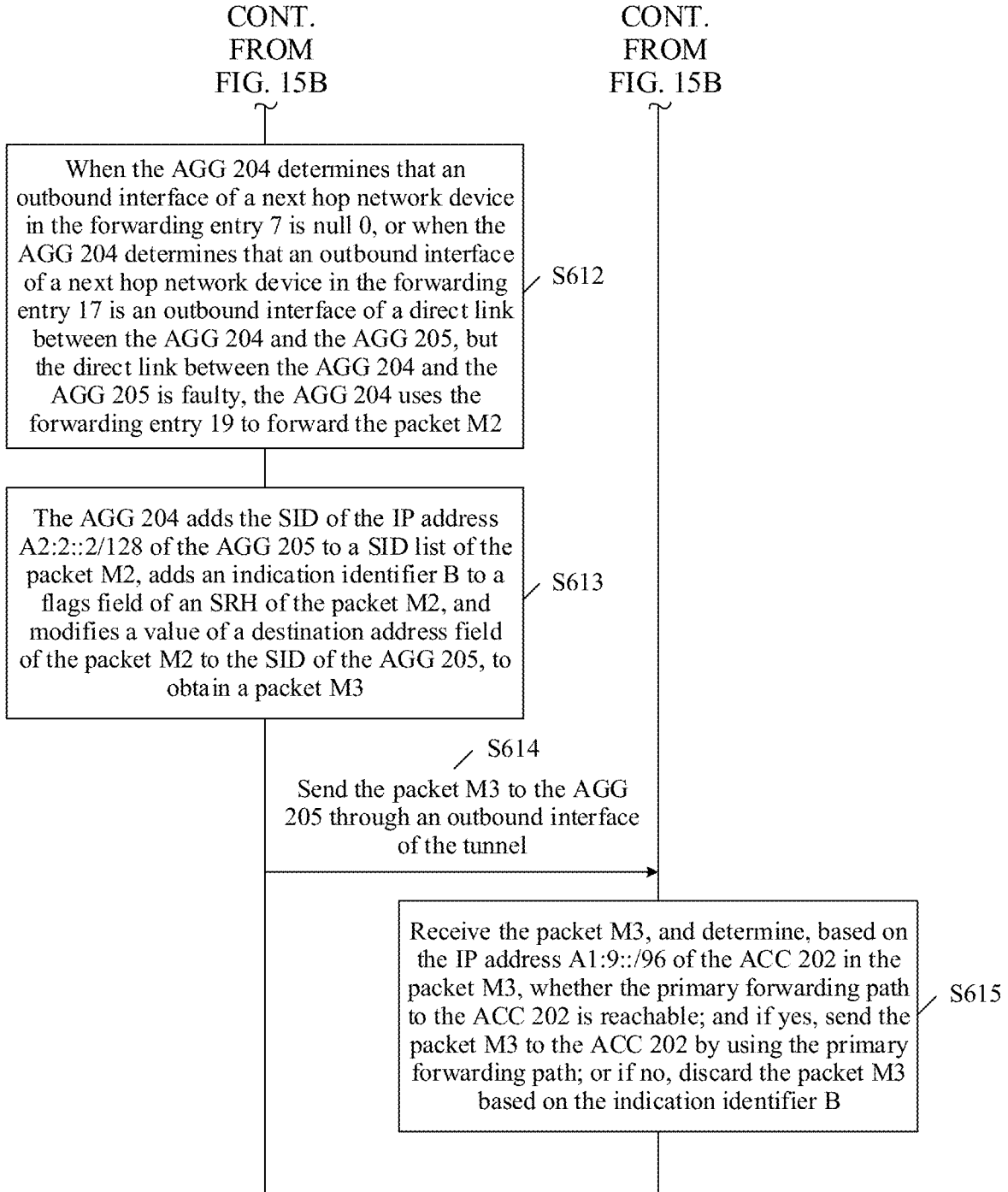

CONT.
FROM
FIG. 15B

CONT.
FROM
FIG. 15B

When the AGG 204 determines that an
outbound interface of a next hop network device
in the forwarding entry 7 is null 0, or when the
AGG 204 determines that an outbound interface
of a next hop network device in the forwarding
entry 17 is an outbound interface of a direct link
between the AGG 204 and the AGG 205, but
the direct link between the AGG 204 and the
AGG 205 is faulty, the AGG 204 uses the
forwarding entry 19 to forward the packet M2

S612

The AGG 204 adds the SID of the IP address
A2:2::2/128 of the AGG 205 to a SID list of the
packet M2, adds an indication identifier B to a
flags field of an SRH of the packet M2, and
modifies a value of a destination address field
of the packet M2 to the SID of the AGG 205, to
obtain a packet M3

S613

S614

Send the packet M3 to the AGG
205 through an outbound interface
of the tunnel

Receive the packet M3, and determine, based on
the IP address A1:9::/96 of the ACC 202 in the
packet M3, whether the primary forwarding path
to the ACC 202 is reachable; and if yes, send the
packet M3 to the ACC 202 by using the primary
forwarding path; or if no, discard the packet M3
based on the indication identifier B

| Destination address of an IPv6 packet header = ACC 202 |
| --- |
| Load |

206

207

| Destination address of an IPv6 packet header = AGG 205 |
| --- |
| SRH ACC 202 |
| Load |

204

205

| Destination address of an IPv6 packet header = ACC 202 |
| --- |
| SRH ACC 202 |
| Load |

201

202

203

| Destination address of an IPv6 packet header = ACC 202 |
| --- |
| Load |

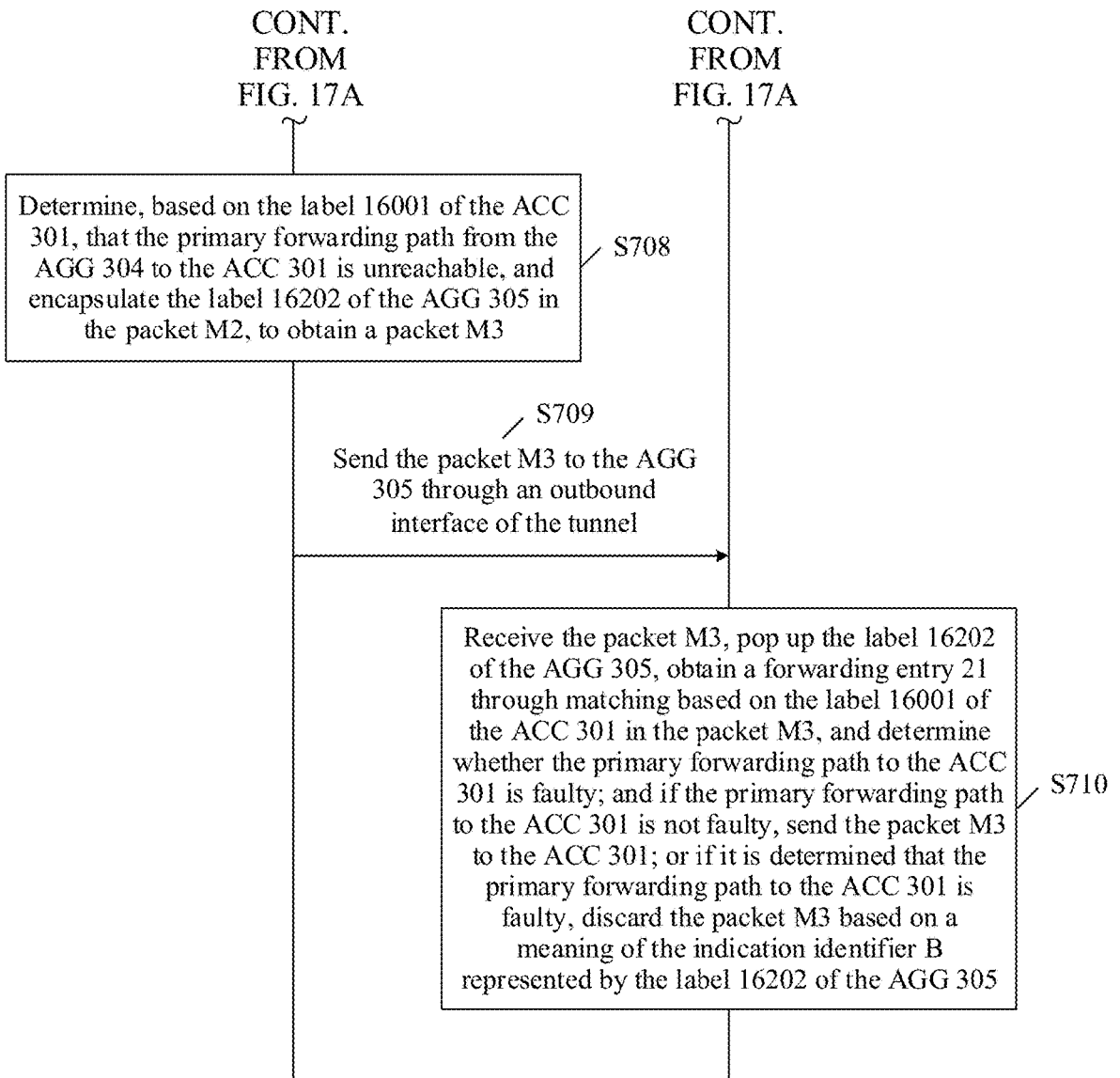

CONT.
FROM
FIG. 17A

CONT.
FROM
FIG. 17A

Determine, based on the label 16001 of the ACC 301, that the primary forwarding path from the AGG 304 to the ACC 301 is unreachable, and encapsulate the label 16202 of the AGG 305 in the packet M2, to obtain a packet M3    S708

S709
Send the packet M3 to the AGG 305 through an outbound interface of the tunnel Receive the packet M3, pop up the label 16202 of the AGG 305, obtain a forwarding entry 21 through matching based on the label 16001 of the ACC 301 in the packet M3, and determine whether the primary forwarding path to the ACC 301 is faulty; and if the primary forwarding path to the ACC 301 is not faulty, send the packet M3 to the ACC 301; or if it is determined that the primary forwarding path to the ACC 301 is faulty, discard the packet M3 based on a meaning of the indication identifier B represented by the label 16202 of the AGG 305    S710

FIG. 17B

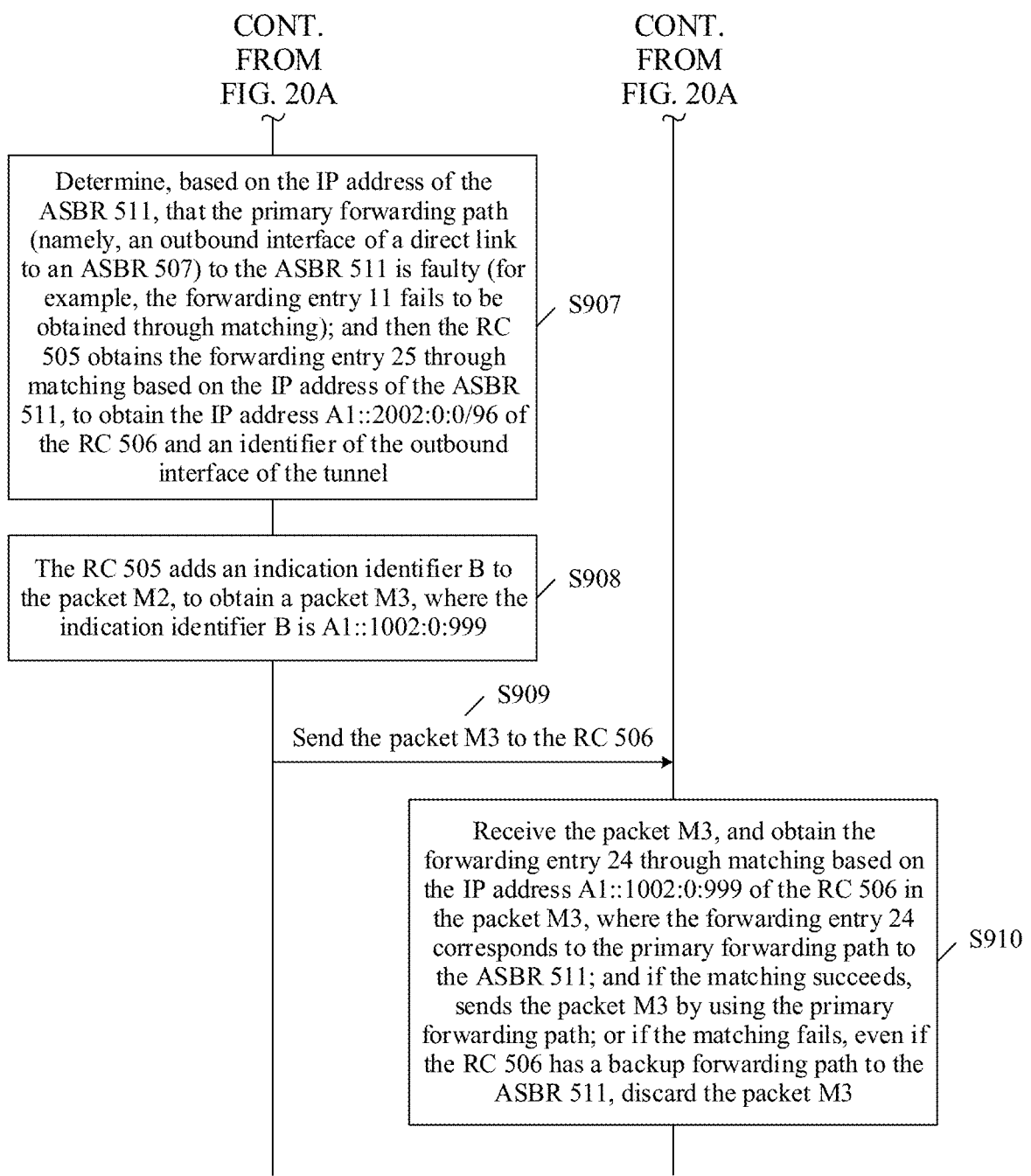

CONT.
FROM
FIG. 20A

CONT.
FROM
FIG. 20A

Determine, based on the IP address of the ASBR 511, that the primary forwarding path (namely, an outbound interface of a direct link to an ASBR 507) to the ASBR 511 is faulty (for example, the forwarding entry 11 fails to be obtained through matching); and then the RC 505 obtains the forwarding entry 25 through matching based on the IP address of the ASBR 511, to obtain the IP address A1::2002:0:0/96 of the RC 506 and an identifier of the outbound interface of the tunnel

S907

The RC 505 adds an indication identifier B to the packet M2, to obtain a packet M3, where the indication identifier B is A1::1002:0:999

S908

S909

Send the packet M3 to the RC 506

Receive the packet M3, and obtain the forwarding entry 24 through matching based on the IP address A1::1002:0:999 of the RC 506 in the packet M3, where the forwarding entry 24 corresponds to the primary forwarding path to the ASBR 511; and if the matching succeeds, sends the packet M3 by using the primary forwarding path; or if the matching fails, even if the RC 506 has a backup forwarding path to the ASBR 511, discard the packet M3

PACKET SENDING METHOD, DEVICE, AND SYSTEM

CROSS-REFERENCE TO RELATED APPLICATIONS

This application is a continuation of International Patent Application No. PCT/CN2020/117006 filed on Sep. 23, 2020, which claims priority to Chinese Patent Application No. 202010106211.9, filed on Feb. 21, 2020 and Chinese Patent Application No. 202010295809.7, filed on Apr. 15, 2020 and Chinese Patent Application No. 202010478986.9, filed on May 29, 2020, and Chinese Patent Application No. 202010711897.4, filed on Jul. 22, 2020. All of the afore-mentioned patent applications are hereby incorporated by reference in their entireties.

TECHNICAL FIELD

This application relates to the communications field, and in particular, to a packet sending method, a device, and a system.

BACKGROUND

To improve network transmission reliability, in some network scenarios, a network device forwards a packet by using a primary forwarding path and a backup forwarding path. If the primary forwarding path is normal, the packet is forwarded by using the primary forwarding path. If the primary forwarding path is faulty, the packet is forwarded by using the backup forwarding path. However, in some sce-narios, forwarding a packet by using the backup forwarding path causes network resource waste or network congestion. For example, in some network scenarios, forwarding a packet by using the backup forwarding path may cause a loop problem of packet forwarding, resulting in network congestion or network bandwidth resource waste.

For example, refer to FIG. 1. A primary forwarding path between a network device 101 and a network device 102 is a direct link between the network device 101 and the network device 102, and a backup forwarding path between the network device 101 and the network device 102 passes through a network device 103, that is, the backup forwarding path is the network device 101→the network device 103→the network device 102. When the primary forwarding path from the network device 101 to the network device 102 is faulty, a loop problem may occur when the network device 101 forwards a packet to the network device 102 via the network device 103 on the backup forwarding path. The loop problem means that after the network device 103 receives the packet from the network device 101, the net-work device 103 returns the packet to the network device 101 for some reasons instead of sending the packet to the network device 102. A loop problem is more likely to occur when some network devices at special locations of a net-work, for example, network devices connected to an access network and a backbone network, use the backup forward-ing path to forward a packet.

Therefore, how to avoid network resource waste or net-work congestion caused by the loop problem is a technical problem that needs to be resolved currently.

SUMMARY

Embodiments of this application provide a packet sending method, so that a specified network device does not use a backup forwarding path to forward a packet, thereby reduc-ing, to some extent, a technical problem such as network resource waste or network congestion caused by a loop problem.

According to a first aspect, a packet sending method is provided. The method may be applied to a first network device, including: obtaining a first packet to a destination device, adding a first indication identifier to the first packet to generate a second packet, and sending the second packet to a second network device by using a first forwarding path. The first indication identifier is used to indicate the second network device to avoid using a backup forwarding path from the second network device to the destination device to send the second packet to the destination device. That is, if the second network device determines that the second packet cannot be sent by using a primary forwarding path to the destination device, the second packet may be discarded. In this way, after the second network device receives the second packet, when the primary forwarding path from the second network device to the destination device is unreach-able, the second network device avoids, based on the first indication identifier, using the backup forwarding path to the destination device to send the second packet to the destina-tion device. This reduces network resource waste and net-work congestion caused by a loop problem.

In an embodiment, the first forwarding path is a backup forwarding path from the first network device to the desti-nation device, and before that the first network device sends the second packet to the second network device by using a first forwarding path, the method further includes: The first network device determines that a second forwarding path to the destination device is unreachable. The second forward-ing path is a primary forwarding path from the first network device to the destination device. That is, when the primary forwarding path from the first network device to the desti-nation device is unreachable, the backup forwarding path is used to forward the second packet, and the first indication identifier is added to the first packet, so that a flexible packet forwarding manner can be implemented. That is, when a first network node has forwarded a packet by using the backup forwarding path from the first network device to the desti-nation network device, the second network device needs to be prevented from using the backup forwarding path from the second network device to the destination network device to forward the packet. Certainly, the first forwarding path may alternatively be the primary forwarding path from the first network device to the destination device.

In an embodiment, in some scenarios such as segment routing (SR) over Internet protocol version 6 (IPv6) ("SRv6" for short below), the first packet includes an Internet protocol (IP) address of the destination device, and the IP address of the destination device may be considered as an identifier of the destination device. The first forward-ing path is a forwarding path corresponding to a summary route from the first network device to the destination device, and the second forwarding path is a forwarding path corre-sponding to a specific route from the first network device to the destination device. There are the following two possible implementations in which the first network device deter-mines that the second forwarding path to the destination device is unreachable: The first network device fails to obtain, through matching based on the IP address of the destination device, the specific route to the destination device; or the first network device obtains, through matching based on the IP address of the destination device, the specific route to the destination device, and determines that the forwarding path corresponding to the specific route is unreachable.

In an embodiment, the first forwarding path is a backup forwarding path of the specific route to the destination device, and that the first network device determines that a second forwarding path to the destination device is unreachable includes: The first network device obtains, through matching based on the IP address of the destination device, the specific route to the destination device, and determines that a primary forwarding path of the specific route is unreachable.

In an embodiment, the first forwarding path is a primary forwarding path of the summary route to the destination device, and that the first network device determines that a second forwarding path to the destination device is unreachable includes: The first network device obtains, through matching based on the IP address of the destination device, the summary route to the destination device, and determines that a primary forwarding path of the summary route is unreachable.

The foregoing three possible implementations do not constitute a limitation on the technical solutions of this application, and persons skilled in the art may design the technical solutions based on an actual case.

In an embodiment, the first network device adds a segment routing header (SRH) to the first packet to generate the second packet. The first indication identifier is carried in the SRH.

In an embodiment, the first indication identifier is carried in a flags field, a tag field, or a type length value (TLV) of the SRH.

In an embodiment, the SRH includes a segment identifier list, and the segment identifier list includes the first indication identifier. The segment identifier list includes a segment identifier of the second network device, and the segment identifier of the second network device includes the first indication identifier. In an embodiment, a locator part of the segment identifier of the second network device includes the first indication identifier, or a function part of the segment identifier of the second network device includes the first indication identifier. That the locator part includes the first indication identifier may be that all or some bytes of the locator part are the first indication identifier. Optionally, the first indication identifier is the segment identifier of the second network device, that is, the segment identifier of the second network device has an indication function indicated by the first indication identifier.

In some other scenarios (for example, an SR-MPLS scenario), the first packet includes a label of the destination device, and the label of the destination device may be considered as an identifier of the destination device. The first forwarding path is a forwarding path corresponding to backup forwarding information in a label forwarding entry corresponding to the label of the destination device, that is, the first forwarding path is the backup forwarding path from the first network device to the destination device. That the first network device determines that a second forwarding path to the destination device is unreachable includes: The first network device obtains the label forwarding entry through matching based on the label of the destination device, and determines that a forwarding path corresponding to primary forwarding information in the label forwarding entry is unreachable. The forwarding path corresponding to the primary forwarding information may be considered as the primary forwarding path from the first network device to the destination device. That is, if the forwarding path corresponding to the primary forwarding information from the first network device to the destination device is unreachable, the second packet may be forwarded by using the backup forwarding path from the first network device to the destination device, to ensure reliability of transmission of the second packet.

In an embodiment, the forwarding entry may further include the first indication identifier and/or a second indication identifier.

In an embodiment, the first network device adds a label stack to the first packet to generate the second packet. The label stack includes the first indication identifier.

There may be two possible implementations. In a possible implementation, the label stack includes a label of the second network device, a special label, and the label of the destination device, the label of the second network device is adjacent to the special label, and the special label includes the first indication identifier, that is, the special label may have an indication function of the first indication identifier. In another possible implementation, the label stack includes a label of the second network device and the label of the destination device, and the label of the second network device is the first indication identifier, that is, the label of the second network device has the indication function of the first indication identifier.

Certainly, the foregoing two possible implementations do not constitute a limitation on the technical solutions of this application, and persons skilled in the art may design the technical solutions based on an actual case.

In an embodiment, before that the first network device sends the second packet to the second network device by using a first forwarding path, the first network device receives a third packet from the second network device. The third packet includes the identifier of the second network device and the second indication identifier, and the second indication identifier is used to identify that the second network device supports a capability of avoiding using a backup path to forward a packet. After receiving the third packet, the first network device may add the first indication identifier to the first packet based on the second indication identifier, to obtain the second packet. This reduces network resource waste and network congestion. Before receiving the first packet, the first network device further generates, based on the identifier of the second network device and the second indication identifier, a forwarding entry corresponding to the first forwarding path. The forwarding entry corresponding to the first forwarding path includes the identifier of the destination device and forwarding information corresponding to the first forwarding path. In this way, after receiving the first packet, the first network device may search for the forwarding entry based on the identifier of the destination device included in the first packet, to obtain the forwarding information of the first forwarding path, and send the second packet to the second network device by using the first forwarding path, to forward the second packet. In some scenarios (for example, the SRv6 scenario), the forwarding information includes a segment identifier list, the segment identifier list includes the identifier of the second network device, the identifier of the second network device includes the segment identifier of the second network device, and the identifier of the destination device includes the IP address of the destination device. In some other scenarios (for example, the SR-MPLS scenario), the forwarding information includes the label of the second network device, and the identifier of the destination device includes the label of the destination device. In an embodiment, the second indication identifier may alternatively be the identifier of the second network device or the label of the second network device. In this case, the identifier of the second network device or the label of the second network device has the indication function of the second indication identifier.

In an embodiment, the third packet includes an endpoint segment identifier (End SID) TLV field, and the End SID TLV includes the second indication identifier. For example, the third packet may be an intermediate system to intermediate system (ISIS) IPv6 packet or an open shortest path first (OSPF) version 3 (v3) packet. When the identifier of the second network device does not have the indication function of the second indication identifier, the End SID TLV further includes the identifier of the second network device.

In an embodiment, the third packet includes a prefix segment identifier (prefix SID) type length value TLV field, and the prefix SID TLV field includes the second indication identifier. The third packet may be, for example, an ISIS packet or an OSPF packet. When the label of the second network device does not have the indication function of the second indication identifier, the End SID TLV further includes the label of the second network device.

In an embodiment, the backup forwarding path passes through the first network device. This can avoid a resource waste problem caused by a loop problem.

In an embodiment, the first packet is from a third network device, the third network device belongs to a first network domain, and the destination device belongs to a second network domain. In other words, the method may be applied to a cross-domain scenario.

In an embodiment, the first network domain is an area of a backbone network, the second network domain is an area of an access network, the first network device is a network device connected to the access network and the backbone network, and the first forwarding path is a forwarding path in the backbone network.

According to a second aspect, a packet sending method is provided. The method is applied to a second network device, including: receiving a first packet destined for a destination device. The first packet is from a first network device, and the first packet includes a first indication identifier. The second network device determines that a primary forwarding path from the second network device to the destination device is unreachable. In response to determining that the primary forwarding path is unreachable, the second network device avoids, based on an indication of the first indication identifier, using a backup forwarding path to send the first packet to the destination device, to reduce a resource waste or network congestion problem caused by forwarding by using a backup path. That the second network device avoids using the backup forwarding path to send a packet may be understood as that the second network device does not use the backup forwarding path to send a packet.

In an embodiment, in some scenarios (for example, the SRv6 scenario), the second network device may determine, in the following three possible implementations, that the primary forwarding path from the second network device to the destination device is unreachable.

In an embodiment, the first packet includes an IP address of the destination device, the primary forwarding path is a primary forwarding path of a summary route from the second network device to the destination device, and the backup forwarding path is a backup forwarding path of the summary route. That the second network device determines that a primary forwarding path from the second network device to the destination device is unreachable includes: The second network device obtains the summary route through matching based on the IP address of the destination device, and determines that the primary forwarding path of the summary route is unreachable.

In another embodiment, the first packet includes an IP address of the destination device. The primary forwarding path is a forwarding path corresponding to a specific route from the second network device to the destination device. The backup forwarding path is a forwarding path corresponding to the summary route from the second network device to the destination device. That the second network device determines that a primary forwarding path from the second network device to the destination device is unreachable includes: The second network device fails to obtain the specific route through matching based on the IP address of the destination device; or the second network device obtains the specific route through matching based on the IP address of the destination device and determines that the forwarding path corresponding to the specific route is unreachable.

The foregoing two embodiments do not constitute a limitation on the technical solutions of this application, and persons skilled in the art may design the technical solutions based on an actual case.

In an embodiment, the first packet is an SRv6 packet, and an SRH of the SRv6 packet includes the first indication identifier.

The first indication identifier may be carried in a flags field, a tag field, or a TLV field of the SRH. Alternatively, the SRH may include a segment identifier list, and the segment identifier list includes the first indication identifier.

When the first packet is the SRv6 packet, In an embodiment, before that the second network device, that a primary forwarding path to the destination device is unreachable, the method further includes: The second network device determines that a destination address of the SRv6 packet is an IP address of the second network device; the second network device obtains an identifier of the destination device from the segment identifier list of the SRv6 packet; and the second network device modifies the destination address of the SRv6 packet to the identifier of the destination device. Correspondingly, that the second network device determines that a primary forwarding path to the destination device is unreachable includes: The second network device determines, based on the destination address of the SRv6 packet, namely, the identifier of the destination device, that the primary forwarding path to the destination device is unreachable.

Alternatively, the first packet may be a multi-protocol label switching (MPLS) packet. Correspondingly, a label stack of the first packet includes the first indication identifier.

When the first packet is an MPLS packet, the first packet includes a label of the destination device, the label stack includes a label of the second network device, a special label, and the label of the destination device, and the special label includes the first indication identifier, that is, the special label has a function of the first indication identifier. Alternatively, the label stack includes a label of the second network device and a label of the destination device, and the label of the second network device includes the first indication identifier, that is, the label of the second network device has a function of the first indication identifier.

When the first packet includes the label stack, in an embodiment, that the second network device determines that a primary forwarding path from the second network device to the destination device is unreachable includes: The second network device determines that a top label of the label stack is the label of the second network device; and in response to determining that the top label of the label stack is the label of the second network device, obtains, through matching based on the label of the destination device, a label forwarding table to the destination device, and determines that the primary forwarding path corresponding to primary forwarding information in the label forwarding table is unreachable.

When the first packet includes the label stack, in an embodiment, the second network device determines that a next-layer label of the label of the second network device in the label stack is the special label; and in response to determining that the next-layer label of the label of the second network device in the label stack is the special label, avoid using the backup forwarding path corresponding to backup forwarding information in the label forwarding table to send the first packet to the destination device. Certainly, in some embodiments, the special label may alternatively be located on the top of the label stack, and the label of the second network device may be located at a next layer of the special label.

In an embodiment, the backup forwarding path passes through the first network device. According to the foregoing method, a loop formed when the first packet is forwarded to the first network device can be avoided, and resource waste and network congestion caused by a loop problem can be reduced.

In an embodiment, the second network device sends a second packet to the first network device. The second packet includes an identifier of the second network device and a second indication identifier, the second indication identifier is used to indicate that the second network device supports a capability of avoiding using a backup path to forward a packet, and the identifier of the second network device includes the IP address of the second network device or the label of the second network device. The second network device sends the second packet to the first network device, so that the first network device knows that the second network device has the capability of avoiding using the backup path to forward a packet. In this way, when sending the first packet to the second network device, the first network device may add the first indication identifier to the first packet, to indicate the second network device to avoid using the backup path to forward the first packet.

In an embodiment, after that the second network device avoids, based on an indication of the first indication identifier, using a backup forwarding path to send the first packet to the destination device, the second network device discards the first packet. The first packet is discarded to avoid using the backup forwarding path to send the first packet to the destination device.

According to a third aspect, a forwarding entry generation method is provided. The method may be applied to a first network device. The first network device receives an advertisement packet from a second network device, where the advertisement packet includes a first indication identifier; and the first network device determines, based on the first indication identifier, that the second network device has a capability of avoiding using a backup path to forward a packet. In response to determining that the second network device has the capability of avoiding using a backup path to forward a packet, the first network device generates backup forwarding information used to forward a packet to a destination device. A forwarding path corresponding to the backup forwarding information passes through the second network device. The backup forwarding information includes a label stack or a segment identifier list, and the label stack or the segment identifier list includes an identifier of the second network device. Based on a forwarding entry, when the first network device receives a first packet to the destination device, the first network device may determine, based on the forwarding entry, whether a forwarding path corresponding to primary forwarding information is reachable. If the forwarding path is reachable, the first network device forwards the first packet to the destination device by using the forwarding path corresponding to the primary forwarding information. If the forwarding path is unreachable, the first network device adds a second indication identifier to the first packet to generate a second packet. The second indication identifier is used to indicate the second network device to avoid using a backup forwarding path from the second network device to the destination device to send the second packet to the destination device. In this way, after the second network device receives the second packet, when a primary forwarding path from the second network device to the destination network device is unreachable, the backup forwarding path is prevented from being used to send the second packet to the destination device. This can reduce a problem of resource waste or network congestion caused by forwarding by using the backup path.

In an embodiment, the first indication identifier is included in the forwarding entry, so that the first network device can add the second indication identifier to the first packet.

In an embodiment, the second packet further includes the label stack or the segment identifier list, and the label stack or the segment identifier list may include a label or a segment identifier of the second network device, so that the first network device can send a packet to the second network device based on the label or the segment identifier of the second network device.

According to a fourth aspect, a forwarding entry generation method is provided. The method may be applied to a second network device, including: generating an advertisement packet. The packet includes a first indication identifier, and the first indication identifier is used to indicate that the second network device has a capability of avoiding using a backup forwarding path to forward a packet. The second network device sends the advertisement packet to a first network device to trigger the first network device to generate a forwarding entry. A forwarding path corresponding to the forwarding entry passes through the second network device. In other words, the first network device may send a packet to the second network device based on the forwarding entry. When forwarding the packet, the second network device does not use the backup forwarding path to forward the packet. This reduces problems of network resource waste and network congestion.

According to a fifth aspect, a packet sending method is provided. The method is applied to a first network device. The first network device receives an advertisement packet sent by a second network device. The advertisement packet includes an identifier of the second network device. The first network device generates a forwarding entry used to forward a packet to a destination device. The forwarding entry includes primary forwarding information and backup forwarding information, a forwarding path corresponding to the primary forwarding information is in a first network domain, and a forwarding path corresponding to the backup forwarding information passes through the second network device. A path from the first network device to the second network device on the forwarding path corresponding to the backup forwarding information is in a second network domain. The first network domain is different from the second network domain, and the backup forwarding information includes the identifier of the second network device. That is, the forwarding path corresponding to the primary forwarding information and the forwarding path corresponding to the backup forwarding information to the destination device pass through different network domains. This can reduce occupation of network resources of the first network domain in which the forwarding path corresponding to the primary forwarding information is located.

In some scenarios (for example, an SRv6 scenario), the backup forwarding information includes a segment identifier list, the segment identifier list includes the identifier of the second network device, and the identifier of the second network device includes a segment identifier of the second network device. In some other scenarios (for example, an SR-MPLS scenario), the backup forwarding information includes a label stack, the label stack or the segment identifier list includes the identifier of the second network device, and the identifier of the second network device includes a label of the second network device.

In an embodiment, the advertisement packet further includes a second indication identifier, and the second indication identifier indicates that the second network device has a capability of avoiding using a backup path to forward a packet.

In an embodiment, the method further includes: The first network device obtains a first packet to the destination device; the first network device determines that the forwarding path corresponding to the primary forwarding information is unreachable; and in response to determining that the forwarding path corresponding to the primary forwarding information is unreachable, the first network device adds a first indication identifier to the first packet to generate a second packet, and forwards the second packet by using the backup forwarding information. The first indication identifier is used to indicate the second network device to avoid using a backup forwarding path from the second network device to the destination device to send the second packet to the destination device.

According to a sixth aspect, a first network device is provided, and is configured to perform the method according to any one of the first aspect and the possible designs of the first aspect. Specifically, the first network device includes units configured to perform the method according to any one of the first aspect and the possible designs of the first aspect; or the first network device includes units configured to perform the method according to any one of the third aspect and the possible designs of the third aspect. The first network device includes units configured to perform the method according to any one of the fifth aspect and the possible designs of the fifth aspect.

According to a seventh aspect, a second network device is provided, and is configured to perform the method according to any one of the second aspect and the possible designs of the second aspect. In an embodiment, the second network device includes units configured to perform the method according to any one of the second aspect and the possible designs of the second aspect; or the second network device includes units configured to perform the method according to any one of the fourth aspect and the possible designs of the fourth aspect.

According to an eighth aspect, a network device is provided, and is applied to a network system including a plurality of network devices. The plurality of network devices include a first network device and a second network device, the network device is the first network device, and the first network device includes a processor and a network interface. The network interface is configured to receive and send a packet. The processor is configured to perform the method according to any one of the first aspect and the possible designs of the first aspect; or the processor is configured to perform the method according to any one of the third aspect and the possible designs of the third aspect; or the processor is configured to perform the method according to any one of the fifth aspect and the possible designs of the fifth aspect.

In an embodiment, the first network device further includes a memory, and the memory may be configured to store instructions or program code. The processor is configured to invoke the instructions or the program code in the memory to perform the method according to any one of the first aspect and the possible designs of the first aspect; or the processor is configured to invoke the instructions or the program code in the memory to perform the method according to any one of the third aspect and the possible designs of the third aspect; or the processor is configured to invoke the instructions or the program code in the memory to perform the method according to any one of the fifth aspect and the possible designs of the fifth aspect.

According to a ninth aspect, a network device is provided, and is applied to a network system including a plurality of network devices. The plurality of network devices include a first network device and a second network device, the network device is the second network device, and the second network device includes a processor and a network interface. The network interface is configured to receive and send a packet. The processor is configured to perform the method according to any one of the second aspect and the possible designs of the second aspect; or the processor is configured to perform the method according to any one of the fourth aspect and the possible designs of the fourth aspect.

In an embodiment, the second network device further includes a memory, and the memory may be configured to store instructions or program code. The processor is configured to invoke the instructions or the program code in the memory to perform the method according to any one of the second aspect and the possible designs of the second aspect; or the processor is configured to invoke the instructions or the program code in the memory to perform the method according to any one of the fourth aspect and the possible designs of the fourth aspect.

According to a tenth aspect, a packet processing system is provided. The system includes the first network device and the second network device according to the foregoing aspects.

According to an eleventh aspect, a computer-readable storage medium is provided, including instructions, a program, or code. When the instructions, the program, or the code is executed on a computer, the computer is enabled to perform the methods according to the foregoing aspects.

According to a twelfth aspect, a computer program product including computer instructions is provided. When the computer program product is run on a network device, the network device is enabled to perform the method according to any one of the first aspect, the second aspect, the third aspect, the fourth aspect, the fifth aspect, and the possible implementations of the foregoing five aspects.

According to a thirteenth aspect, a chip is provided, including a memory and a processor. The memory is configured to store instructions or program code. The processor is configured to invoke the instructions or the program code from the memory and run the instructions or the program code, to perform the method according to any one of the first aspect and the possible designs of the first aspect; or the processor performs the method according to any one of the second aspect and the possible designs of the second aspect;

or the processor performs the method according to any one of the third aspect and the possible designs of the third aspect; or the processor performs the method according to any one of the fourth aspect and the possible designs of the fourth aspect; or the processor performs the method according to any one of the fifth aspect and the possible designs of the fifth aspect.

In an embodiment, the chip includes only a processor. The processor is configured to read and execute the instructions or the program code stored in the memory. When the instructions or the program code is executed, the processor performs the method according to any one of the first aspect and the possible designs of the first aspect; or the processor performs the method according to any one of the second aspect and the possible designs of the second aspect; or the processor performs the method according to any one of the third aspect and the possible designs of the third aspect; or the processor performs the method according to any one of the fourth aspect and the possible designs of the fourth aspect; or the processor performs the method according to any one of the fifth aspect and the possible designs of the fifth aspect.

BRIEF DESCRIPTION OF DRAWINGS

FIG. 6 is a schematic diagram of a format of an End SID TLV field in an ISIS IPv6 packet according to an embodiment of this application;

FIG. 7 is a schematic diagram of a format of an End SID TLV field in an OSPFv3 packet according to an embodiment of this application;

FIG. 8 is a schematic diagram of a format of a prefix SID TLV field included in an ISIS packet according to an embodiment of this application;

FIG. 9 is a schematic diagram of a format of a prefix SID TLV field included in an OSPF packet according to an embodiment of this application;

FIG. 14(a) is a schematic diagram of a label stack according to an embodiment of this application;

FIG. 14(b) is a schematic diagram of another label stack according to an embodiment of this application;

FIG. 15A, FIG. 15B, and FIG. 15C are a flowchart of a packet sending method in a network architecture shown in FIG. 16(a) and FIG. 16(b) according to an embodiment of this application;

FIG. 17A and FIG. 17B are a flowchart of a packet sending method in a network architecture shown in FIG. 18 according to an embodiment of this application;

FIG. 20A and FIG. 20B are a flowchart of a packet sending method in the network architecture shown in FIG. 19 according to an embodiment of this application;

DESCRIPTION OF EMBODIMENTS

Figure 1:
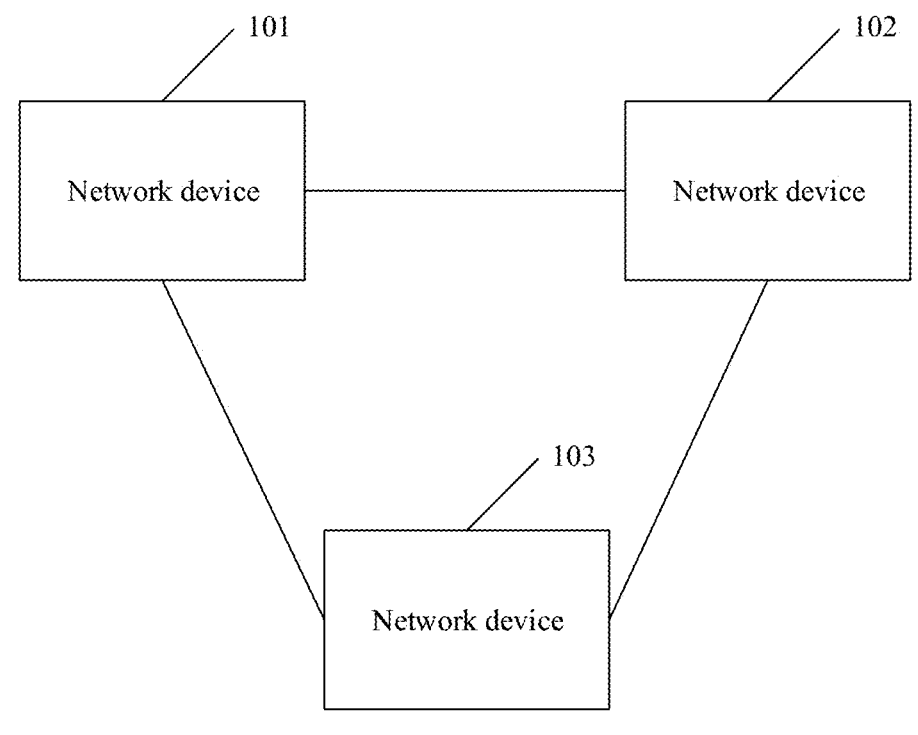
FIG. 1 is a schematic diagram of a network architecture in the conventional technology.

Before the specific technical solutions are described, key terms in embodiments of this application are first described.

A specific route is a route that identifies an IP address of a network device or an address of a network segment to which this network device belongs. Specifically, the specific route includes the IP address and a mask of the network device or the address and a mask of the network segment to which the IP address belongs. For example, if an IP address of a network device is A2:2::2/128, a specific route corresponding to this IP address may be a route corresponding to A2:2::2/128 or a route corresponding to A2:2::/96. The address A2:2::/96 is an address of a network segment to which the address A2:2::2/128 belongs.

A summary route is a route obtained by summarizing a plurality of specific routes that can be aggregated. For example, a network device stores a route A1:8::/96 to a network device whose destination address is A1:8::/96 and a route A1:9::/96 to a network device whose destination address is A1:9::/96, and the network device may aggregate the two routes to obtain an aggregate route A1::/84. Then, the network device may advertise only the summary route to other network devices, thereby saving storage resources of the other network devices.

The following describes embodiments of this application with reference to the accompanying drawings.

Conventionally, a technical problem of network resource waste or network congestion may occur during packet forwarding. The following describes the technical problem in detail with reference to several possible scenarios by using an example in which a loop occurs during packet forwarding and causes network resource waste or network congestion.

Scenario 1

On a medium/large-sized network, a network device requires a large number of memory resources to store a large routing table, and transmitting and processing a large amount of routing information consumes a large number of network resources. To resolve this problem, an interior gateway protocol (IGP) and a border gateway protocol (BGP) provide a route summarization function.

Route summarization is also referred to as route aggregation, indicating that a network device summarizes a plurality of different subnet routes that belong to a same network segment into one summary route. The network device advertises the summary route to a neighboring network device of the network device, and does not advertise the plurality of different subnet routes corresponding to the summary route. This reduces a quantity of forwarding entries in a routing table of the neighboring network device and occupation of system resources. In addition, if a subnet route of the summarized subnet routes in the network segment is frequently deleted and added, the network device does not need to notify the neighboring network device of the subnet route. This is because the subnet route is notified to the neighboring network device in a form of the summary route, so that route flapping in a network is avoided, and network stability is improved to some extent.

Although the use of a summary route can reduce a quantity of forwarding entries stored in a network device, a loop problem exists in some link fault scenarios.

Figure 2:
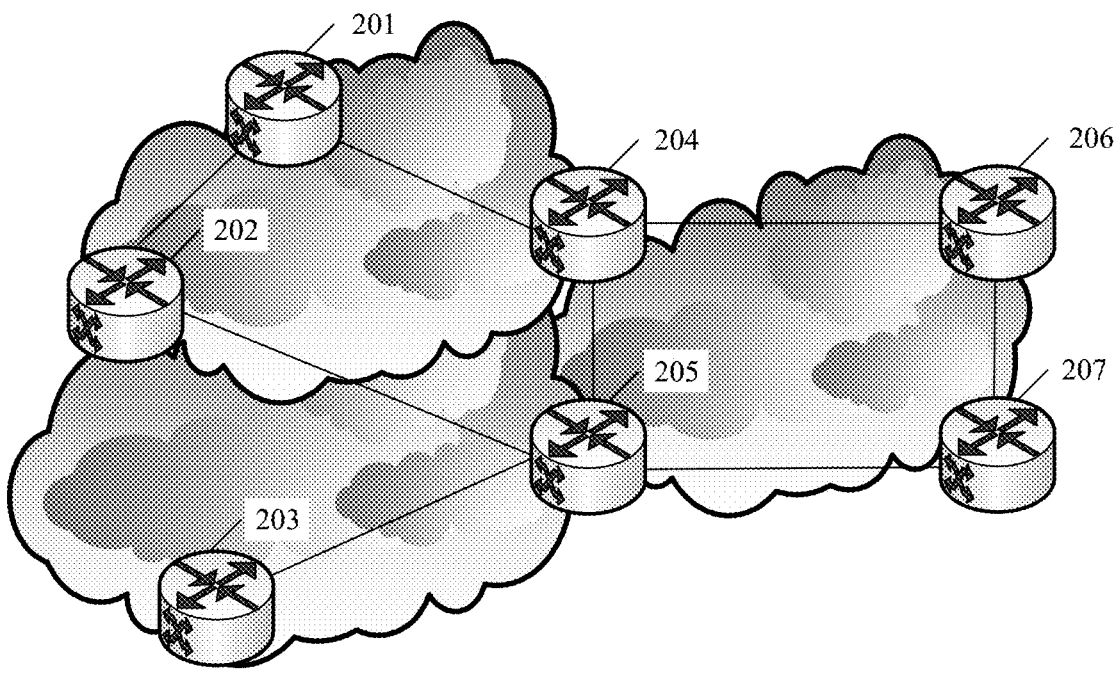
FIG. 2 is a schematic diagram of a network architecture applied to an SRv6 scenario according to an embodiment of this application.

FIG. 2 is a schematic diagram of a network architecture using an SRv6 technology.

In FIG. 2, the network architecture includes an access device, an aggregation device, and a regional core device. The access device may be an access node (ACC), the aggregation device may be an aggregation node (AGG), and the regional core device may be a regional core node (RC).

The access device includes an ACC 201, an ACC 202, and an ACC 203, the aggregation device includes an AGG 204 and an AGG 205, and the regional core device includes an RC 206 and an RC 207. Their connection relationships are: The ACC 201 is connected to the ACC 202 and the AGG 204, the ACC 202 is further connected to the AGG 205, the ACC 203 is connected to the AGG 205, the AGG 204 is connected to the AGG 205 and the RC 206, the AGG 205 is further connected to the RC 207, and the RC 206 is further connected to the RC 207.

Addresses of the foregoing devices in the network architecture may be IPv6 addresses, or may be Internet protocol version 4 (Internet Protocol version 4, IPv4) addresses. For ease of description, the following uses an IPv6 address as an example for description. In the network architecture in FIG. 2, an IP address (namely, an IPv6 address) of the ACC 201 is A1:8::/96, an IP address of the ACC 202 is A1:9::/96, and an IP address of the ACC 203 is A1:A::/96.

The ACC 201, the ACC 202, the AGG 204, and the AGG 205 belong to an access ring 1 in an access network, the ACC 203, the AGG 204, and the AGG 205 belong to an access ring 2 in the access network, and the AGG 204, the AGG 205, the RC 206, and the RC 207 belong to an aggregation ring in a backbone network.

The AGG 204 summarizes a specific route A1:8::/96 of the ACC 201 and a specific route A1:9::/96 of the ACC 202 in the access ring 1 into a summary route A1::/84, and advertises the summary route to a network device in the aggregation ring. Simultaneously, the AGG 204 generates the specific route corresponding to the IP address A1:8::/96 of the ACC 201 and the specific route corresponding to the IP address A1:9::/96 of the ACC 202.

The AGG 205 also summarizes the specific route A1:8::/96 of the ACC 201 and the specific route A1:9::/96 of the ACC 202 in the access ring 1 into a summary route A1::/84, and advertises the summary route to a network device in the aggregation ring. The AGG 205 generates the specific route corresponding to the IP address A1:8::/96 of the ACC 201 and the specific route corresponding to the IP address A1:9::/96 of the ACC 202.

The AGG 204 generates a forwarding table. The forwarding table includes a forwarding entry 1 and a forwarding entry 2 that are shown in Table 1. The forwarding entry 1 is the specific route corresponding to the IP address A1:8::/96, and the forwarding entry 2 is the specific route corresponding to the IP address A1:9::/96. The forwarding entry 1 includes the IP address A1:8::/96 of the ACC 201 and an outbound interface (indicating an identifier of this interface, which is similar below). The outbound interface is an interface of the AGG 204 on a forwarding path from the AGG 204 to the ACC 201. The forwarding entry 2 includes the IP address A1:9::/96 of the ACC 202 and an outbound interface, and the outbound interface is an interface of the AGG 204 on a forwarding path from the AGG 204 to the ACC 202. Specifically, the outbound interface in the forwarding entry 1 is an outbound interface corresponding to a shortest path from the AGG 204 to the ACC 201, and the outbound interface of the forwarding entry 2 is an outbound interface corresponding to a shortest path from the AGG 204 to the ACC 202. The outbound interface may be an interface corresponding to a direct link between the AGG 204 and the ACC 201.

TABLE 1

| Identifier of a forwarding entry | Destination address | Outbound interface |
|---|---|---|
| 1 | A1:8::/96 | Outbound interface of a direct link to the ACC 201 |
| 2 | A1:9::/96 | Outbound interface of a direct link to the ACC 201 |

In addition, the AGG 204 separately receives summary routes A1::/84 that are from the AGG 205 and the RC 206 respectively and that are advertised by the AGG 205, and generates a corresponding forwarding entry 3 and a corresponding forwarding entry 4. Refer to Table 2. The forwarding entry 3 includes a summary route A1::/84 and an outbound interface, and the outbound interface is an outbound interface of the AGG 204 on a direct link between the AGG 204 and the AGG 205. The forwarding entry 4 includes a summary route A1::/84 and an outbound interface, and the outbound interface is an outbound interface of the AGG 204 on a direct link between the AGG 204 and the RC 206. Costs (costs) of the direct link from the AGG 204 to the AGG 205 are lower than costs of a link AGG 204→RC 206→RC 207→AGG 205. Therefore, a priority of a route corresponding to the direct link from the AGG 204 to the AGG 205 is higher than a priority of a route corresponding to the link AGG 204→RC 206→RC 207→AGG 205. A forwarding path AGG 204→RC 206→RC 207→AGG 205 may serve as a topology-independent loop-free alternate (Topology-Independent Loop-free Alternate, TI-LFA) path.

TABLE 2

| Identifier of a forwarding entry | Destination address | Outbound interface |
|---|---|---|
| 3 | A1::/84 | Outbound interface of a direct link to the AGG 205 |
| 4 | A1::/84 | Outbound interface of a direct link to the RC 206 |

Refer to Table 3. The table is a forwarding entry generated by the AGG 205, and Table 3 includes a forwarding entry 5 and a forwarding entry 6. The forwarding entry 5 includes the IP address A1:9::/96 of the ACC 202 and an outbound interface, and the outbound interface is an interface of the AGG 205 on a direct link between the AGG 205 and the ACC 202. The forwarding entry 6 includes the IP address A1:A::/96 of the ACC 203 and an outbound interface, and the outbound interface is an interface of the AGG 205 on a direct link between the AGG 205 and the ACC 203.

TABLE 3

| Identifier of a forwarding entry | Destination address | Outbound interface |
|---|---|---|
| 5 | A1:9::/96 | Outbound interface of a direct link to the ACC 202 |
| 6 | A1:A::/96 | Outbound interface of a direct link to the ACC 203 |

In addition, the AGG 205 separately receives summary routes A1::/84 that are from the AGG 204 and the RC 207 respectively and that are advertised by the AGG 204, and generates a corresponding forwarding entry 7 and a corresponding forwarding entry 8. Refer to Table 4. The forwarding entry 7 includes a summary route A1::/84, and an outbound interface of the summary route is an outbound interface of the AGG 205 on a direct link to the AGG 204. The forwarding entry 8 includes a summary route A1::/84, and an outbound interface of the summary route is an outbound interface of the AGG 205 on a direct link to the RC 207. Costs of the direct link between the AGG 205 and the AGG 204 are lower than costs of a link AGG 205→RC 207→RC 206→AGG 204. Therefore, a priority of a route corresponding to the direct link from the AGG 205 to the AGG 204 is higher than a priority of a route corresponding to the link AGG 205→RC 207→RC 206→AGG 204.

TABLE 4

| Identifier of a forwarding entry | Destination address | Outbound interface of a next-hop network device |
|---|---|---|
| 7 | A1::/84 | Outbound interface of a direct link to the AGG 204 |
| 8 | A1::/84 | Outbound interface of a direct link to the RC 207 |

When a link AGG 204→ACC 201→ACC 202 is normal, the RC 206 sends a packet to the ACC 202. When the packet arrives at the AGG 204, the AGG 204 searches Table 1 to find a routing entry 2 of the specific route corresponding to the IP address A1:9::/96 of the ACC 202, and then sends the packet to the ACC 201 through the outbound interface that is determined based on the routing entry 2 and that is on the direct link to the ACC 201. Next, the ACC 201 forwards the packet to the ACC 202.

When the direct link between the AGG 204 and the ACC 201 is faulty, the AGG 204 deletes the specific route to the ACC 201 and the specific route to the ACC 202, that is, the AGG 204 deletes the forwarding entry 1 and the forwarding entry 2. When the direct link between the AGG 204 and the AGG 205 is normal, after the AGG 204 receives a packet from the RC 206, the AGG 204 fails to obtain, through matching based on a destination address of the packet, namely, the IP address of the ACC 202, the forwarding entry 2 corresponding to the specific route to the ACC 202, but obtains the forwarding entry corresponding to the summary route A1::/84 through matching. Specifically, a priority of a route corresponding to the forwarding entry 3 is higher than a priority of a route corresponding to the forwarding entry 4. Therefore, the AGG 204 may send the packet to the AGG 205 through the outbound interface that is determined based on the forwarding entry 3 and that is on the direct link to the AGG 205. After receiving the packet, the AGG 205 obtains the forwarding entry 5 through matching based on an IP address of the packet, and forwards the packet to the ACC 202 through the outbound interface that is determined based on the forwarding entry 5 and that is on the direct link to the ACC 202.

If a link between the AGG 205 and the ACC 202 is faulty, the AGG 205 deletes the forwarding entry 5. Therefore, after receiving the packet from the AGG 204, the AGG 205 fails to obtain the forwarding entry 5 through matching, that is, fails to obtain the specific route to the ACC 202 through matching, but obtains the forwarding entry 7 through matching, that is, obtains the summary route A1::/84 to the AGG 204 through matching. Therefore, the AGG 205 returns the packet to the AGG 204, resulting in a loop, resource waste, and even network congestion.

Further, if the direct link between the AGG 204 and the AGG 205 is alternatively faulty, the AGG 204 deletes the forwarding entry 3. Therefore, after receiving a packet from the RC 206, the AGG 204 fails to obtain, through matching based on a destination address of the packet, namely, the IP address of the ACC 202, the forwarding entry 2 corresponding to the specific route to the ACC 202, fails to obtain the forwarding entry 3 corresponding to the summary route through matching, but obtains the forwarding entry 4 corresponding to the summary route A1::/84 through matching. The outbound interface, in the forwarding entry 4, corresponding to the summary route A1::/84 is the outbound interface of the direct link to the RC 206. Therefore, the AGG 204 sends the packet to the RC 206 through the outbound interface of the direct link between the AGG 204 and the RC 206, and the RC 206 sends the packet to the AGG 205 through the RC 207. When the link between the AGG 205 and the ACC 202 is faulty, the AGG 205 fails to obtain, through matching based on the IP address of the ACC 202, the forwarding entry 5 corresponding to the specific route to the ACC 202, but can obtain a forwarding entry corresponding to the summary route A1::/84 through matching. A priority of a route corresponding to the forwarding entry 7 corresponding to the summary route A1::/84 is higher than a priority of a route corresponding to the forwarding entry 8 corresponding to the summary route A1::/84. Therefore, if the direct link between the AGG 204 and the AGG 205 is normal, the AGG 205 obtains, through matching based on the IP address of the ACC 202, the forwarding entry 7 corresponding to the summary route A1::/84, and then returns the packet to the AGG 204 through the outbound interface of the direct link to the AGG 204, resulting in a loop. Further, if the direct link between the AGG 204 and the AGG 205 is alternatively faulty, the AGG 205 fails to obtain, through matching based on the IP address of the ACC 202, the forwarding entry 5 corresponding to the specific route to the ACC 202, fails to obtain the forwarding entry 7 corresponding to the summary route A1::/84 through matching, but obtains the forwarding entry 8 corresponding to the summary route A1::/84 through matching. Therefore, the AGG 205 returns the packet to the AGG 204 through the RC 207 based on the outbound interface of the direct link between to the RC 207, resulting in a loop, resource waste, and even network congestion.

Similar to the fault of the link between the AGG 204 and the AGG 205, when no physical link exists between the AGG 204 and the AGG 205, the foregoing loop problem also exists.

Scenario 2

Figure 3:
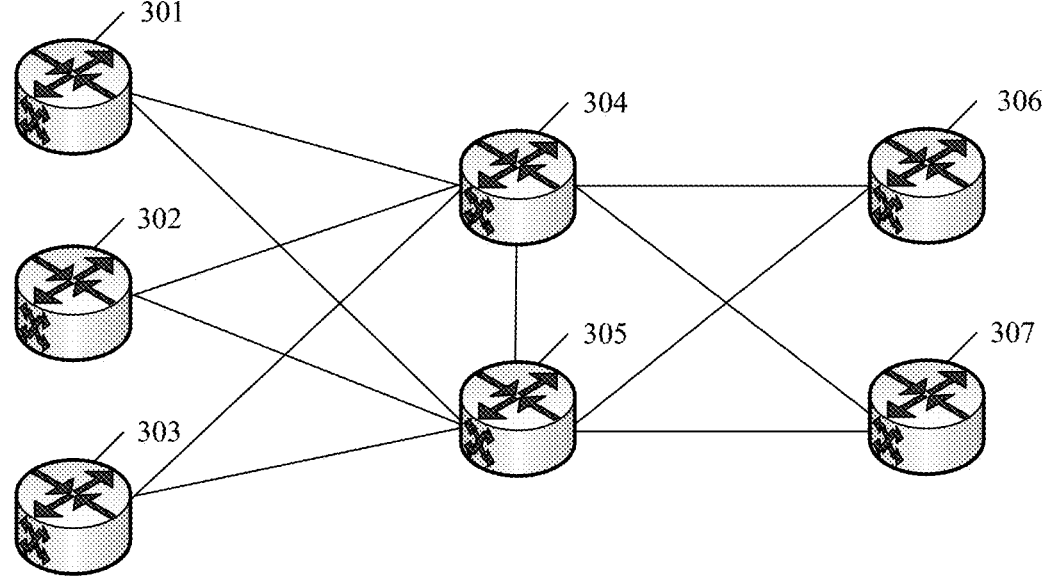
FIG. 3 is a schematic diagram of a network architecture applied to an SR-MPLS application scenario according to an embodiment of this application.

FIG. 3 is a schematic diagram of a network architecture using an SR multi-protocol label switching (MPLS) technology.

In FIG. 3, the network architecture includes an access device, an aggregation device, and a regional core device. The access device may be an ACC, the aggregation device may be an AGG, and the regional core device may be an RC.

Specifically, the network architecture includes an ACC 301, an ACC 302, an ACC 303, an AGG 304, an AGG 305, an RC 306, and an RC 307. The ACC 301, the ACC 302, and the ACC 303 each are connected to the AGG 304 and the AGG 305, and the AGG 304 and the AGG 305 each are connected to the RC 306 and the RC 307.

The ACC 301, the ACC 302, the ACC 303, the AGG 304, and the AGG 305 belong to an IGP domain (domain) 1, and the AGG 304, the AGG 305, the RC 306, and the RC 307 belong to an IGP domain 2.

A label of the ACC 301 is 16001, a label of the ACC 302 is 16002, a label of the ACC 303 is 16003, a label of the AGG 304 is 16101, and the label of the AGG 305 is 16102. The ACC 301, the ACC 302, the ACC 303, the AGG 304, and the AGG 305 advertise their respective labels in the IGP domain 1, and the AGG 304 and the AGG 305 advertise their respective labels in the IGP domain 2.

The AGG 304 determines a primary forwarding path to the ACC 301, namely, a direct link from the AGG 304 to the ACC 301, based on the label 16001 received from the ACC 301, and generates a corresponding forwarding entry 9. Refer to Table 5. In this table, the forwarding entry 9 includes the label 16001 of the ACC 301 and an outbound interface, and the outbound interface is an outbound interface of the AGG 304 on the direct link to the ACC 301.

TABLE 5

| Identifier of a forwarding entry | Label | Outbound interface |
|---|---|---|
| 9 | 16001 | Outbound interface of a direct link to the ACC 301 |

The AGG 304 may generate a backup forwarding path to the ACC 301. The backup forwarding path is AGG 304→AGG 305→ACC 301, and a corresponding forwarding entry 10 is generated based on the backup forwarding path. Refer to Table 6. In this table, the forwarding entry 10 includes the label 16001 of the ACC 301 and an outbound interface, and the outbound interface is an interface of the AGG 304 on a direct link to the AGG 305.

TABLE 6

| Identifier of a forwarding entry | Label | Outbound interface |
|---|---|---|
| 10 | 16001 | Outbound interface of a direct link to the AGG 305 |

In addition, the AGG 305 generates a forwarding entry 11 based on the label 16001 received from the ACC 301. Refer to Table 7. The forwarding entry 11 includes the label 16001 of the ACC 301 and an outbound interface, and the outbound interface is an interface of the AGG 305 on a direct link to the ACC 301.

TABLE 7

| Identifier of a forwarding entry | Label | Outbound interface |
|---|---|---|
| 11 | 16001 | Outbound interface of a direct link to the ACC 301 |

The AGG 305 may further generate a backup forwarding path to the ACC 301. The backup forwarding path is AGG 305→AGG 304→ACC 301, and a corresponding forwarding entry 12 is generated based on the backup forwarding path. Refer to Table 8. In this table, the forwarding entry 12 includes the label 16001 of the ACC 301 and an outbound interface, and the outbound interface is an interface of the AGG 305 on a direct link to the AGG 304.

TABLE 8

| Identifier of a forwarding entry | Label | Outbound interface |
|---|---|---|
| 12 | 16101 | Outbound interface of a direct link to the AGG 304 |

The AGG 304 receives a packet from the RC 306. The packet carries the label 16001 of the ACC 301, identifying that a destination node of the packet is the ACC 301. When the AGG 304 determines that the direct link between the AGG 304 and the ACC 301 is faulty, the AGG 304 obtains the forwarding entry 10 through matching based on the label 16001 of the ACC 301, and obtains, through matching, the outbound interface corresponding to the label 16001 of the ACC 301, namely, the outbound interface of the direct link between the AGG 304 and the AGG 305. In addition, the label 16102 of AGG 305 is pushed into the packet, and then the packet is sent to the AGG 305. After the AGG 305 receives the packet, if it is determined that the direct link to the ACC 301 is normal, the AGG 305 sends the packet to the ACC 301; or if it is determined that the direct link to ACC 301 is faulty, the forwarding entry 12 is obtained through matching based on the label 16001 of the ACC 301, and the outbound interface corresponding to the label 16001 of the ACC 301 is obtained through matching, that is, the outbound interface of the direct link to the AGG 304 is obtained through matching. In addition, the label 16101 of the AGG 304 is pushed into the packet, and then the packet is sent to the AGG 304, resulting in a loop, network resource waste, and even network congestion.

It can be learned from the examples of the foregoing two scenarios that, if a loop problem occurs, a packet cannot be transmitted to a destination node, and normal network communication is affected.

To overcome the technical problem, an embodiment of this application provides a packet sending method, to reduce a technical problem of resource waste or network congestion in a network communication process. Before the packet sending method is described, a network architecture to which the method is applicable is first described.

Figure 4:
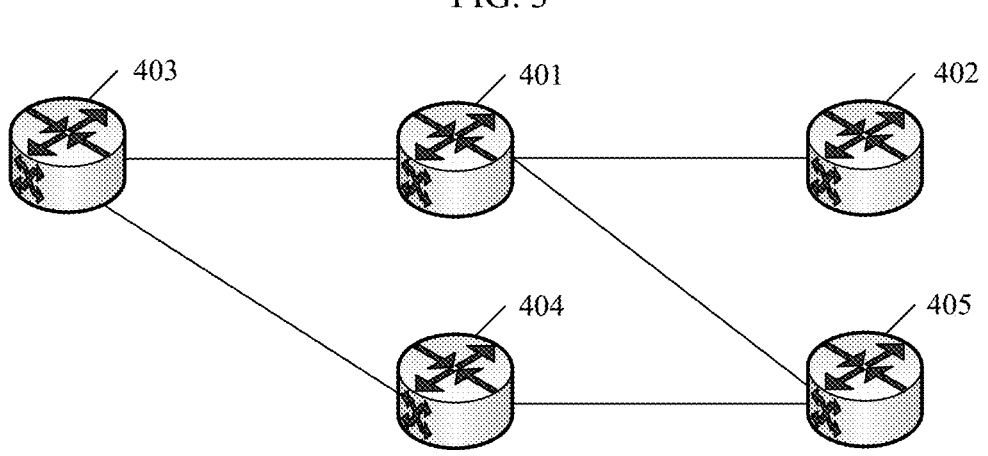
FIG. 4 is a schematic diagram of a structure of a network architecture 500 according to an embodiment of this application.

FIG. 4 is a schematic diagram of a structure of a network architecture 500 according to an embodiment of this application.

In FIG. 4, the network architecture 500 includes a network device 401, a network device 402, a network device 403, a network device 404, and a network device 405. The network device 401 is connected to the network device 402, the network device 403, and the network device 404. The network device 404 is connected to the network device 403 and the network device 405.

In this embodiment of this application, the network device 401, the network device 402, the network device 403, the network device 404, and the network device 405 may be a router (router), a switch (switch), or the like. This is not limited in this embodiment of this application.

The following describes the packet sending method according to this embodiment of this application with reference to FIG. 4. In the method, the network device 404 sends an advertisement packet to the network device 401, and the advertisement packet includes an identifier of the network device 404 and an indication identifier A, the indication identifier A is used to indicate that the network device 404 supports a capability of avoiding using a backup path to forward a packet. After receiving the advertisement packet, the network device 401 obtains a forwarding path of the network device 403. The forwarding path passes through the network device 404, and a forwarding entry corresponding to the forwarding path is generated. The forwarding entry includes at least an identifier of the network device 403 and an outbound interface. After the network device 401 receives a first packet whose destination is the network device 403, the network device 401 searches for the forwarding entry based on the identifier of the network device 403, to obtain the identifier of the network device 404 and an outbound interface. The network device 401 adds the indication identifier A to the first packet to obtain a second packet, and forwards the second packet to the network device 404 through the outbound interface. The indication identifier A is used to indicate the network device 404 to avoid using a backup forwarding path from the network device 404 to the network device 403 to send the second packet to the network device 403. When the network device 404 determines that a primary forwarding path from the network device 404 to the network device 403 is unreachable, the network device 404 no longer uses the backup forwarding path based on an indication of the indication identifier A to send the second packet to the network device 403, but directly discards the second packet.

The method mainly relates to a first network device and a second network device. The first network device may be the network device 401 in FIG. 4, and the second network device may be the network device 404 in FIG. 4. The packet sending method may be applied to a scenario such as SR-MPLS, SRv6, MPLS, Internet protocol version 6 (IPv6), or Internet protocol version 4 (IPv4). The following uses SRv6 and SR-MPLS scenarios as examples to describe this method.

Figure 5:
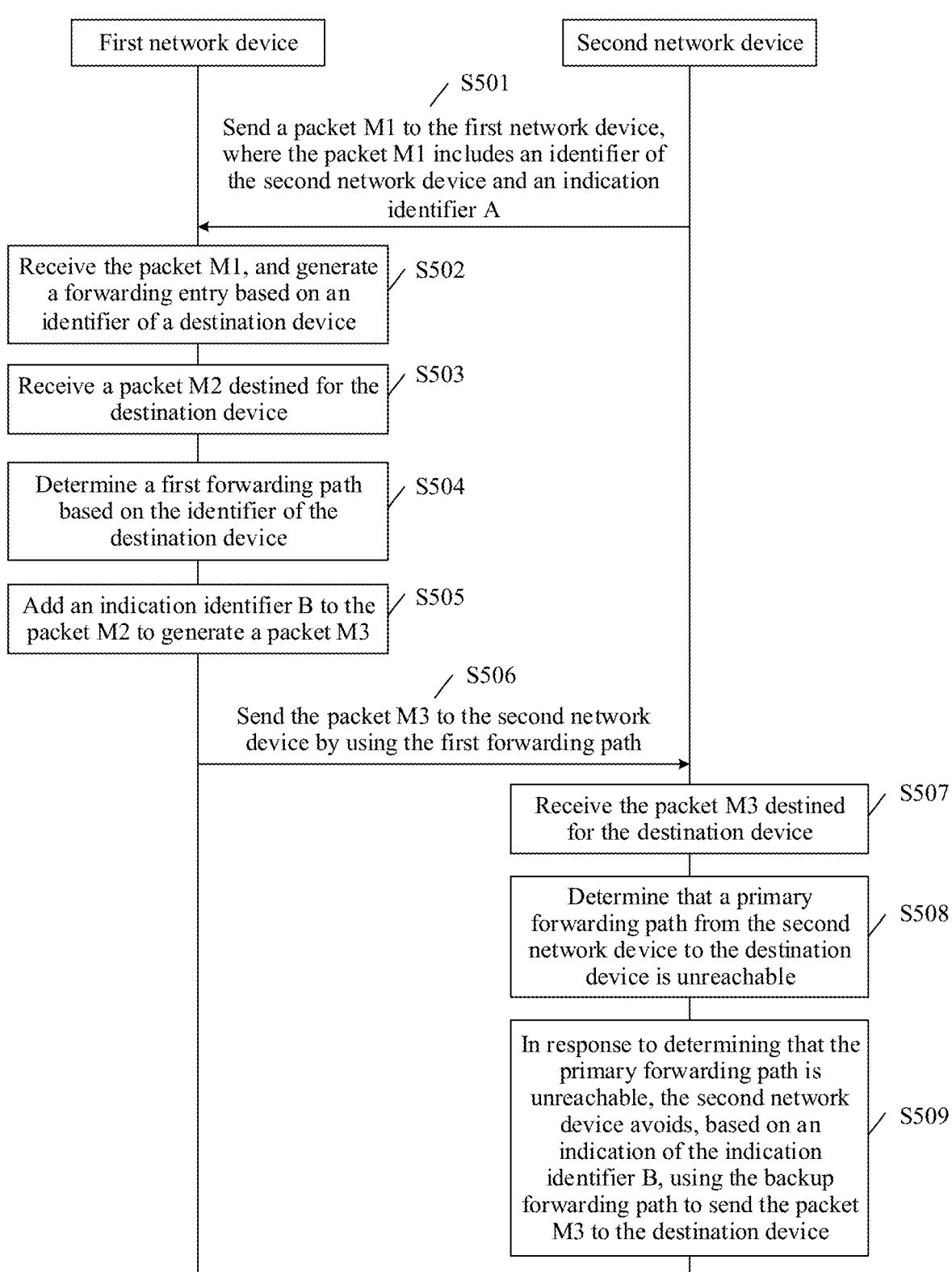
FIG. 5 is a flowchart of a packet sending method according to an embodiment of this application.

FIG. 5 is a flowchart of a packet sending method according to an embodiment of this application. The packet sending method includes the following operations.

S501: A second network device sends a packet M1 to a first network device, where the packet M1 includes an identifier of the second network device and an indication identifier A.

When the method is applied to an SRv6 scenario, the identifier of the second network device may be a segment identifier (SID) of the second network device, and the segment identifier may be an IPv6 address of the second network device. When the method is applied to an SR-MPLS scenario, the identifier of the second network device may be a label of the second network device. Certainly, the identifier of the second network device may alternatively be identified in another form, for example, a router identifier (ID). This is not limited in this embodiment of this application. The identifier of the second network device may be obtained through configuration.

The indication identifier A is used to identify that the second network device a capability of supporting avoiding using a backup forwarding path to forward a packet. That the second network device has a capability of avoiding using a backup forwarding path to forward a packet is specifically: When the second network device forwards the packet to a destination device, if a primary forwarding path and the backup forwarding path exist for forwarding the packet to the destination device, when the primary forwarding path is unreachable, the backup forwarding path is no longer used to forward the packet to the destination device. In this way, a problem of a packet forwarding loop caused by using the backup forwarding path to forward a packet is avoided, and then resource waste or network congestion are avoided. In an embodiment of this application, the indication identifier A and the identifier of the second network device may be two pieces of independent information, or may be combined as a whole. When the indication identifier A and the identifier of the second network device are two pieces of independent information, the indication identifier A may be obtained by the second network device in a configuration manner. When the indication identifier A and the identifier of the second network device are combined as a whole, the identifier of the second network device not only may identify the second network device, but also may be used to identify that the second network device has a capability of supporting avoiding using a backup forwarding path to forward a packet.

After the second network device obtains the identifier of the second network device and the indication identifier A, the second network device may send, to the first network device in a flooding manner, the packet M1 that carries the identifier of the second network device and the indication identifier A. The packet M1 may be an advertisement packet, for example, an intermediate system to intermediate system (ISIS) packet or an open shortest path first (OSPF) packet.

When this embodiment of this application is applied to the SRv6 scenario, if the packet M1 is an ISIS IPv6 packet or an OSPF version 3 (v3) packet, the packet M1 may include an endpoint segment identifier (End SID) type length value (TLV) field. The End SID TLV field may include the identifier of the second network device and the indication identifier A.

FIG. 6 is a schematic diagram of a format of an End SID TLV field in an ISIS IPv6 packet. In the figure, the End SID TLV field includes a type field, a length field, a flags field, an SRv6 endpoint function field, a SID field, a Sub-sub-tlv-len field, a sub-sub-TLVs field, and the like.

A value of the type field identifies a type of the End SID TLV field. A value of the length field indicates a length of the sTLV. The flags field occupies 8 bits. A value of the SRv6 endpoint function field is a legal function value of the End SID TLV. The End SID TLV field may include one or more SID fields, and each SID field is 128 bits. A value of one SID field may include the SID of the second network device. Specifically, the SID of the second network device includes a locator part and a function part. The SID of the second network device is an IPv6 address of the second network device, and the SID of the second network device may be considered as the identifier of the second network device. A value of the Sub-sub-tlv-len field is a length corresponding to the Sub-sub-tiv field. A Sub-sub-tiv field is optional.

FIG. 7 is a schematic diagram of a format of an End SID TLV field in an OSPFv3 packet. In the figure, the End SID TLV field includes a type field, a length field, a flags field, a reserved field, an endpoint behavior field, a SID field, a sub-TLVs field, and the like.

A value of the type field is used to indicate a type of the End SID TLV. A value of the length field is a length of the End SID TLV. The flags field occupies 8 bits. A value of the endpoint behavior field is determined based on a specific situation, and details are not described herein again. The End SID TLV field may include one or more SID fields, and each SID field is 128 bits. A value of one SID field may include the SID of the second network device, or may be considered as the identifier of the second network device. Specifically, the SID field includes a locator part and a function part, and a value of the SID field is an IP address of the second network device. The sub-TLVs field is optional.

For the foregoing ISIS IPv6 packet or OSPFv3 packet, the indication identifier A may be carried in a plurality of manners:

In a first possible implementation, a value of a type field in the End SID TLV field is used to indicate that the End SID TLV field is a specific type of End SID TLV, and this type of End SID TLV indicates that the second network device has a capability of supporting avoiding using a backup forwarding path to forward a packet. That is, the type field in the End SID TLV field carries the indication identifier A.

In a second possible implementation, a value of the flags field in the End SID TLV field is used to indicate that the second network device has a function of the indication identifier A, that is, the flags field carries the indication identifier A. For example, one or more bits in the flags field are used to carry the indication identifier A. For example, a value of an eighth bit in the flags field is 1, identifying the indication identifier A. When the first network device receives the packet M1 and determines that the value of the eighth bit in the flags field is 1, the first network device determines that the second network device has the capability of supporting avoiding using a backup forwarding path to forward a packet. In an embodiment of this application, the bit carrying the indication identifier A in the flags field may be referred to as a bypass flag, and the bit may be marked as B, namely, an abbreviation of Bypass Flags.

In a third possible implementation, the SID field of the second network device in the End SID TLV field carries the indication identifier A, and the SID of the second network device may also be referred to as a bypass SID.

In the third possible implementation, there are still three possible implementations:

Implementation (a): A function part of the bypass SID includes the indication identifier A.

Implementation (b): The bypass SID is used to identify the second network device, and also has a function of the indication identifier A.

Implementation (c): Some bits of a locator of the bypass SID have a function of the indication identifier A.

When this embodiment of this application is applied to the SR-MPLS scenario, if the packet M1 is an ISIS packet or an OSPF packet, the packet M1 may include a prefix segment identifier (prefix SID) TLV field, and the prefix SID TLV field may include the identifier of the second network device and the indication identifier A.

FIG. 8 is a schematic diagram of a format of a prefix SID TLV field included in an ISIS packet. The prefix SID TLV field includes a type field, a length field, a flags field, an algorithm field, and one of the following three fields: a SID field, an indication (Index) field, and a label field.

A value of the type field indicates a type of the prefix SID TLV. A value of the length field is a length of the prefix SID TLV field. A value of the flags field may include a value flag (V-Flag) bit, a local flag (L-Flag) bit, or the like. A value of the algorithm field indicates an algorithm (for example, a shortest path method) used by a router to calculate reachability to other network devices or an algorithm used to calculate prefixes of these other network devices. A value of the SID/index/label field includes the label of the second network device, and the label of the second network device may be considered as the identifier of the second network device.

FIG. 9 is a schematic diagram of a format of a prefix SID TLV field included in an OSPF packet. The prefix SID TLV field includes a type field, a length field, a flags field, a reserved field, a multi-topology (MT) ID field, an algorithm field, and one of the following three fields: a SID field, an index field, or a label field.

A value of the type field indicates a type of the prefix SID TLV. A value of the length field is a length of the prefix SID TLV field. A value of the flags field may include a value flag bit, a local flag bit, or the like. A value of the SID/index/label field includes the label of the second network device, and the label of the second network device may be considered as the identifier of the second network device.

For the foregoing ISIS packet or OSPF packet, the indication identifier A may be carried in a plurality of manners:

In a first possible implementation, a value of a type field in the prefix SID TLV field is used to indicate that the prefix SID TLV is a special prefix SID TLV, and this type of TLV is used to indicate that the second network device supports a capability of avoiding using a backup forwarding path to forward a packet. That is, the type field in the prefix SID TLV field carries the indication identifier A.

In a second possible implementation, a value of the flags field in the prefix SID TLV field is used to indicate that the second network device has a function of the indication identifier A, that is, the flags field carries the indication identifier A. For example, one or more bits in the flags field are used to carry the indication identifier A. For example, a value of an eighth bit in the flags field is 1, identifying the indication identifier A. When the first network device receives the packet M1 and determines that the value of the eighth bit in the flags field is 1, the first network device determines that the second network device has the capability of supporting avoiding using a backup forwarding path to forward a packet. In this embodiment of this application, the bit carrying the indication identifier A in the flags field may be referred to as a bypass flag, and the bit may be marked as B, namely, an abbreviation of Bypass Flags.

In a third possible implementation, a value of the SID/index/label field is the label of the second network device, and the label of the second network device has a function of the identifier of the second network device and also has an indication function of the indication identifier A.

S502: The first network device receives the packet M1, and generates a forwarding entry based on an identifier of the destination device.

In an embodiment of this application, the destination device is a network device that communicates with the first network device. The destination device may be a router, a switch, a terminal device, a server, or the like. This is not limited in this embodiment of this application. For example, when the first network device is the network device 401 in FIG. 4, the destination device may be the network device 403 in FIG. 4.

When the method is applied to the SRv6 scenario, the identifier of the destination device may be an IP address of the destination device. When the method is applied to the SR-MPLS scenario, the identifier of the destination device may be a label of the destination device. Certainly, the identifier of the destination device may alternatively be identified in another form, for example, a router ID. This is not limited in this embodiment of this application.

In this embodiment of this application, the destination device may send the identifier of the destination device to the first network device in advance in a flooding manner, so that the first network device can obtain the identifier of the destination device.

After obtaining the packet M1, the first network device generates the forwarding entry based on the identifier of the destination device and the identifier of the second network device in the packet M1. A first forwarding path corresponding to the forwarding entry is a forwarding path from the first network device to the destination device. The forwarding entry includes the identifier of the destination device and forwarding information of the first forwarding path. When the forwarding information is applied to the SRv6 scenario, the forwarding information may include a segment identifier list, the segment identifier list includes the segment identifier of the second network device, and the segment identifier of the second network device is the IP address of the second network device. When the method is applied to the SR-MPLS scenario, the forwarding information includes a label stack, and the label stack includes the label of the second network device.

In addition to the segment identifier of the second network device or the label of the second network device, the forwarding information may further include an identifier of an outbound interface. The outbound interface is an interface that is on the first forwarding path and that is to a next-hop network device.

In a possible embodiment, the first forwarding path from the first network device to the second network device may be a tunnel. After receiving the packet M1, the first network device generates, based on the identifier of the second network device, the tunnel that arrives at the second network device. The identifier of the outbound interface that corresponds to the next-hop network device and that is on the first forwarding path is an interface corresponding to the tunnel.

In this embodiment of this application, the first forwarding path may be considered as a backup forwarding path from the first network device to the destination device. The backup forwarding path is relative to the primary forwarding path. In some embodiments, when the primary forwarding path from the first network device to the destination device is normal, the first network device sends a data packet (for example, a packet M2 in the following) to the destination device by using the primary forwarding path. If the primary forwarding path is faulty, the first network device may send the data packet to the second network device by using the first forwarding path, and the second network device sends the data packet to the destination device. In this embodiment of this application, the primary forwarding path from the first network device to the destination device may be referred to as a second forwarding path.

When an application scenario of this embodiment of this application is the SRv6 scenario, there are the following three possible cases for the first forwarding path and the second forwarding path:

Case 1: The second forwarding path is a forwarding path of a specific route corresponding to an IP address of a destination device, and correspondingly, the first forwarding path is a forwarding path of a summary route corresponding to the IP address of the destination device.

Case 2: The second forwarding path is a primary forwarding path of a summary route corresponding to an IP address of a destination device, and correspondingly, the first forwarding path is a backup forwarding path of the summary route corresponding to the IP address of the destination device.

Case 3: The second forwarding path is a primary forwarding path of a specific route corresponding to an IP address of a destination device, and correspondingly, the first forwarding path is a backup forwarding path of the specific route corresponding to the IP address of the destination device.

When the application scenario of this embodiment of this application is the SR-MPLS scenario, the second forwarding path is a forwarding path corresponding to primary forwarding information in a label forwarding entry corresponding to the label of the destination device. Correspondingly, the first forwarding path is a forwarding path corresponding to backup forwarding information in the label forwarding entry corresponding to the label of the destination device. The primary forwarding information may include the label of the destination device and an outbound interface. The backup forwarding information may include the label of the destination device, a label stack, and an outbound interface, and the label stack includes the label of the second network device. When the packet M2 is subsequently forwarded, the label stack may be pushed into the packet M2, to obtain a packet M3.

In addition, the forwarding entry corresponding to the first forwarding path may include special indication information. Alternatively, the forwarding entry is set to a special forwarding entry, to indicate that the forwarding entry is a forwarding entry that the first network device can search for when the second forwarding path is unreachable. Optionally, the forwarding entry corresponding to the first forwarding path may further include the indication identifier A.

In some embodiments, the first forwarding path may alternatively be the primary forwarding path from the first network device to the destination device.

S503: The first network device receives the packet M2 destined for the destination device.

In an embodiment of this application, the packet M2 may be a data packet, namely, a packet carrying service data. The packet M2 includes the identifier of the destination device, that is, the packet M2 needs to reach the destination device.

The packet M2 may be from a third network device, and the third network device may be, for example, the network device 402 in the embodiment shown in FIG. 4. In some embodiments, the third network device belongs to a first network domain, and the destination device belongs to a second network domain. In this case, the first network device and the second network device may belong to both the first network domain and the second network domain, and the first network device and the second network device may be provider edge (provider edge, PE) nodes.

For example, the first network domain is an area of a backbone network, the second network domain is an area of an access network, the first network device is a network device connected to the access network and the backbone network, and the first forwarding path is a forwarding path in the backbone network.

For another example, both the first network domain and the second network domain are IGP domains, but IGP domain numbers of the first network domain and the second network domain are different. The first network device is a network device connected to the two IGP domains.

For another example, both the first network domain and the second network domain are BGP domains, but BPG domain numbers of the first network domain and the second network domain are different. The first network device is a network device connected to the two BGP domains.

S504: The first network device determines the first forwarding path based on the identifier of the destination device.

In an embodiment of this application, the first network device searches, based on the identifier of the destination device in the packet M2, for the forwarding entry including the identifier of the destination device, and determines, based on the forwarding entry, the corresponding first forwarding path, namely, a backup forwarding path from the first network device to the second network device.

When the application scenario is the SRv6 scenario, with reference to the foregoing three cases of the first forwarding path and the second forwarding path, S504 includes the following three possible implementations.

(1) The first forwarding path is the forwarding path of the summary route corresponding to the IP address of the destination device, and the second forwarding path is the forwarding path of the specific route corresponding to the IP address of the destination device. Operation S504 is specifically: When the first network device fails to obtain, through matching based on the IP address of the destination device, the specific route corresponding to the IP address of the destination device, or when the first network device obtains, through matching based on the IP address of the destination device, the specific route corresponding to the IP address of the destination device and determines that the forwarding path corresponding to the specific route is unreachable, the first network device determines that the forwarding path corresponding to the summary route to the IP address of the destination device is the first forwarding path.

(2) The first forwarding path is the backup forwarding path of the summary route corresponding to the IP address of the destination device, and the second forwarding path is the primary forwarding path of the summary route corresponding to the IP address of the destination device. Operation S504 is specifically: When the first network device obtains, through matching based on the IP address of the destination device, the summary route corresponding to the IP address of the destination device and determines that the primary forwarding path of the summary route is unreachable, the first network device determines that the backup forwarding path of the summary route is the first forwarding path.

(3) The first forwarding path is the backup forwarding path of the specific route corresponding to the IP address of the destination device, and the second forwarding path is the primary forwarding path of the specific route corresponding to the IP address of the destination device. Operation S504 is specifically: When the first network device obtains, through matching based on the IP address of the destination device, the specific route corresponding to the IP address of the destination device and determines that the primary forwarding path of the specific route is unreachable, the first network device determines that the backup forwarding path of the specific route is the first forwarding path.

In some other embodiments, when the application scenario is the SR-MPLS scenario, the label forwarding entry that corresponds to the label of the destination device and that is stored in the first network device may include the primary forwarding information and the backup forwarding information. The primary forwarding information corresponds to the primary forwarding path from the first network device to the destination device, namely, the second forwarding path; and the backup forwarding information corresponds to the backup forwarding path from the first network device to the destination device, namely, the first forwarding path. When the first network device obtains the label forwarding entry through matching based on the label of the destination device, and determines that the second forwarding path is unreachable, the first network device may determine the first forwarding path based on the label of the destination device, and forward the packet M2 by using the first forwarding path.

S505: The first network device adds an indication identifier B to the packet M2 to generate the packet M3.

In an embodiment of this application, the indication identifier B is used to indicate a network device on the first forwarding path to avoid using a backup path to send the packet M3 to the destination device. The network device on the first forwarding path may include only the second network device, or may include another network device on the first forwarding path other than the second network device.

In the SRv6 scenario, the indication identifier B may be carried in a segment routing header (segment router header, SRH) of the packet M3.

In a first possible implementation, the indication identifier B may be carried in a flags field of the SRH of the packet M3.

Figures 10, 11:
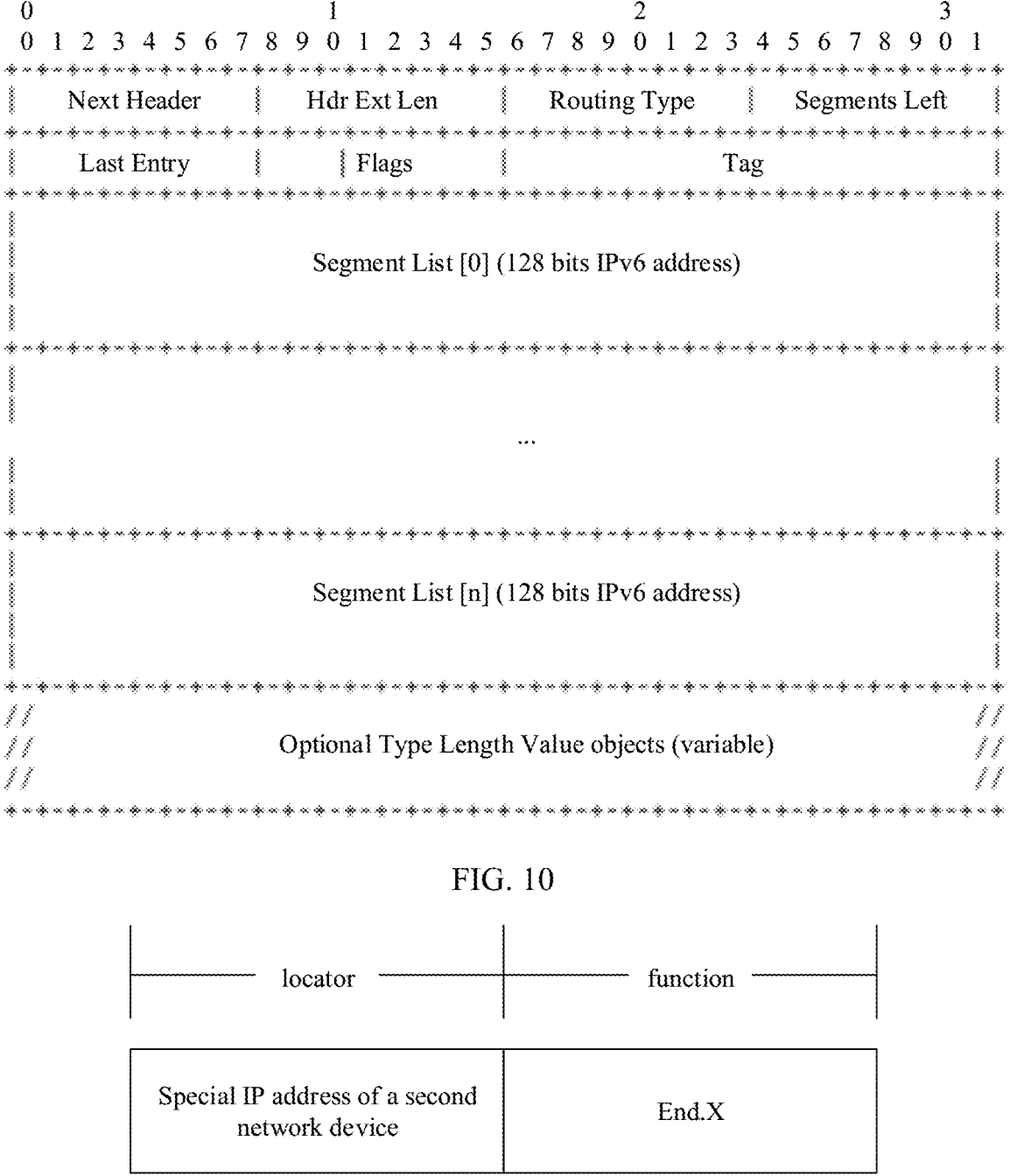
FIG. 10 is a schematic diagram of a format of an SRH of an SRv6 packet according to an embodiment of this application.
FIG. 11 is a schematic diagram of a format of an implementation (a) of a Bypass SID in an SRv6 scenario according to an embodiment of this application.

For example, refer to FIG. 10 that is a schematic diagram of a format of an SRH of an SRv6 packet. In this figure, the SRH of the SRv6 packet includes a basic header (next header) field, an SRH length (Hdr Ext Len) field, a routing type, a segments left field, a last entry field, a flags field, a tag field, a segment identifier list field, and an optional TLV objects field.

A value of the next header field is 43, indicating that a next header is a routing extension header. A value of the Hdr Ext Len field is a length of the SRH. A value of the routing type field is 4, indicating that the SRH is carried. A value of the segments left field is the number of a next SID, an initial value is n−1, and n indicates a quantity of SIDs. A value of the last entry field is the number of the last SID on a packet forwarding path. A value of the tag field is used to mark a group of packets having a same feature. A value of the segment list field is a SID list. In an embodiment of this application, one or more bits in the flags field are used to carry the indication identifier B. For example, a value of an eighth bit in the flags field is 1, identifying the indication identifier B. When the second network device receives the packet M3 and determines that the value of the eighth bit in the flags field is 1, the second network device determines that the second network device avoids using a backup path to send the packet M3 to the destination device. In this embodiment of this application, the bit carrying the indication identifier B in the flags field may be referred to as a bypass (Bypass) flag, and the bit may be marked as B, namely, an abbreviation of Bypass Flags.

In a second possible implementation, the indication identifier B may be carried in a SID list field of the SRH of the packet M3. In this case, the SID list includes the SID of the second network device, the SID of the second network device includes the indication identifier B, and the SID of the second network device including the indication identifier B may also be referred to as a bypass SID.

In the SRv6 scenario, the SID of the second network device includes a locator part and a function part, and the SID of the second network device includes the IP address of the second network device. In this scenario, there are three possible implementations:

Implementation (a): Refer to FIG. 11. The Bypass SID may be a special IPv6 address, which may identify the second network device, and may also have an indication function of the indication identifier B. A value of the function part may be End.X, indicating that after receiving the packet M3, a network device that receives the packet M3 reduces the value of Segments Left by 1, replaces a value of a destination address field in an IPv6 packet header with a value of a SID in a SID list indicated after the reduction by 1, and forwards the packet M3 to a next-hop network device.

Implementation (b): Some bytes in the locator of the bypass SID also have a function of the indication identifier B. The function part is the same as that in an implementation (a).

Figures 12, 13:
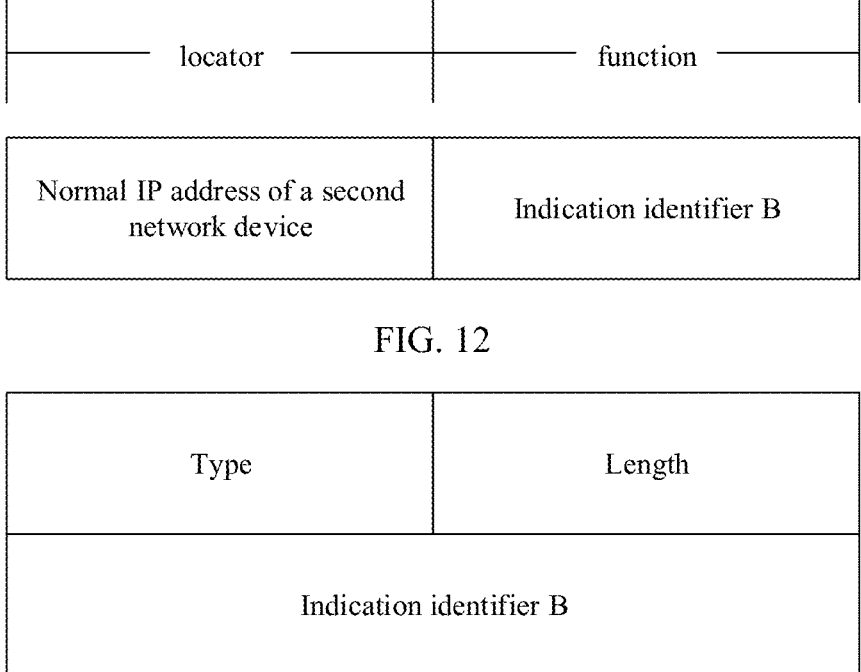
FIG. 12 is a schematic diagram of a format of an implementation (c) of a Bypass SID in an SRv6 scenario according to an embodiment of this application.
FIG. 13 is a schematic diagram of a format of a newly added TLV field of a packet M3 SRH in an SRv6 scenario according to an embodiment of this application.

Implementation (c): Refer to FIG. 12. A function part of the bypass SID includes the indication identifier B.

In a third possible implementation, refer to FIG. 13. The indication identifier B may be carried in a newly added TLV field of the SRH of the packet M3. The newly added TLV field includes a type field, a length field, and a value field. A value of the type field is a type of the newly added TLV field, a value of the length field is a length of the TLV field, and a value of the value field is the indication identifier B.

The foregoing possible implementations do not constitute a limitation on the technical solutions of this application, and persons skilled in the art may design the technical solutions based on an actual case.

In the SR-MPLS scenario, the packet M3 includes a label stack, and the indication identifier B may be carried in the label stack of the packet M3.

In a first possible implementation, the label stack of the packet M3 may include the label of the destination device, the label of the second network device, and a special label. The special label has a function of the indication identifier B, and the label of the second network device is adjacent to the special label, that is, the special label may be at an upper layer of the label of the second network device, or may be at a lower layer of the label of the second network device. Refer to FIG. 14(*a*). The label of the second network device is at the top of the label stack, and the special label is a next-layer label adjacent to the label of the second network device. Refer to FIG. 14(*b*). The special label is at the top of the label stack, and the label of the second network device is a next-layer label adjacent to the special label.

In a second possible implementation, the label stack of the packet M3 includes the label of the destination device and the label of the second network device. In addition to identifying the second network device, the label of the second network device further has a meaning of the indication identifier B.

The foregoing possible implementations do not constitute a limitation on the technical solutions of this application, and persons skilled in the art may design the technical solutions based on an actual case. In addition, in the SRv6 scenario, in some embodiments, the packet M3 may not include the segment identifier of the second network device. Alternatively, in the SRv6 scenario, in some embodiments, a SID list of the packet M3 may further include a SID of a previous-hop network device of the second network device on the first forwarding path, a function part of the SID includes End.X, and End.X is an operation defined in SRv6 Programming, indicating that the previous-hop network device forwards the packet M3 to a layer 3 (layer 3, L3) outbound interface corresponding to the SID.

S506: The first network device sends the packet M3 to the second network device by using the first forwarding path.

As mentioned above, when the first forwarding path is a tunnel, a network device (except the second network device) that the tunnel passes through forwards only the packet M3, and does not perform corresponding processing based on the indication identifier B in the packet M3. When the first forwarding path is not a tunnel, optionally, the network device on the first forwarding path avoids, based on the indication identifier B, using the backup forwarding path to send the packet M3 to the destination device, to avoid a loop problem.

In addition, it is assumed that the network device on the first forwarding path includes a fourth network device, for example, the fourth network device is the network device 405 in FIG. 4, that is, in FIG. 4, the network device 405 and the network device 402 are two independent network devices. In another embodiment, the fourth network device and the third network device may be a same network device. When the destination device belongs to the second network domain, the fourth network device may belong to the first network domain, that is, the first forwarding path does not pass through the second network domain. This is intended to save network resources of the second network domain, and is applicable to a case in which network resources of a network device in the first network domain are greater than network resources of a network device in the second network domain.

S507: The second network device receives the packet M3 destined for the destination device.

S508: The second network device determines that the primary forwarding path from the second network device to the destination device is unreachable.

S509: In response to determining that the primary forwarding path is unreachable, the second network device avoids, based on an indication of the indication identifier B, using the backup forwarding path to send the packet M3 to the destination device.

Because the packet M3 includes the identifier of the destination device, the second network device may determine, based on the identifier of the destination device, whether the primary forwarding path to the destination device is reachable. The primary forwarding path is relative to the backup forwarding path, and both the primary forwarding path and the backup forwarding path are forwarding paths from the second network device to the destination device. In an embodiment of this application, when the primary forwarding path is unreachable, the second network device does not use, based on an indication of the indication identifier B, the backup forwarding path to send the packet M3 to the destination device, to reduce resource waste or network congestion. When the backup forwarding path passes through the first network device, a loop problem generated between the second network device and the first network device can be avoided by using the method. The second network device may discard the packet M3 after avoiding using the backup forwarding path to send the packet M3 to the destination device.

In some embodiments of the SRv6 scenario, the identifier of the destination device is the IP address of the destination device. In the SRv6 scenario, there are three possible cases for the primary forwarding path and the backup forwarding path from the second network device to the destination device. The following separately describes S508 and S509 in detail with reference to the three possible cases.

Case 1: The primary forwarding path from the second network device to the destination device is a forwarding path corresponding to a specific route to the destination device, and the backup forwarding path from the second network device to the destination device is a forwarding path corresponding to a summary route to the destination device. In this case, when the second network device fails to obtain a corresponding specific route through matching based on the IP address of the destination device, it indicates that the primary forwarding path from the second network device to the destination device is unreachable. Therefore, even if a summary route corresponding to the IP address of the destination device exists, the packet M3 is not sent by using the backup forwarding path corresponding to the summary route. Alternatively, although the second network device obtains the specific route through matching based on the IP address of the destination device, the forwarding path corresponding to the specific route is unreachable, so that even if the summary route corresponding to the IP address of the destination device exists, the second network device does not send, based on the indication of the indication identifier B, the packet M3 by using the backup forwarding path corresponding to the summary route.

Case 2: The primary forwarding path from the second network device to the destination device is a primary forwarding path of a summary route to the destination device, and the backup forwarding path is a backup forwarding path of the summary route to the destination device. When the second network device obtains the summary route through matching based on the IP address of the destination device and determines that the primary forwarding path of the summary route is unreachable, the second network device does not use, based on the indication of the indication identifier B, the backup forwarding path of the summary route to send the packet M3 to the destination device.

Case 3: The primary forwarding path from the second network device to the destination device is a primary forwarding path of a specific route to the destination device, and the backup forwarding path is a backup forwarding path of the specific route to the destination device. When the second network device obtains the specific route through matching based on the IP address of the destination device, but the primary forwarding path of the specific route is unreachable, the second network device does not use, based on the indication of the indication identifier B, the backup forwarding path of specific route to send the packet M3.

For the foregoing three cases, for specific implementation of the indication identifier B, refer to related descriptions of S505. Details are not described herein again.

In addition, the determining that the primary forwarding path is unreachable is specifically: The second network device first determines that a destination address of the packet M3 is the IP address of the second network device, and obtains the identifier of the destination device from a segment identifier list of the SRv6 packet; and then the second network device modifies the destination address of the packet M3 to the identifier of the destination device. In this case, the second network device determines, based on the destination address of the packet M3, that the primary forwarding path to the destination device is unreachable.

In the SR-MPLS scenario, the identifier of the destination device is a label of the destination device. The label forwarding entry that corresponds to the label of the destination device and that is stored in the second network device includes the primary forwarding information and the backup forwarding information. The primary forwarding information corresponds to the primary forwarding path from the second network device to the destination device, and the backup forwarding information corresponds to the backup forwarding path from the second network device to the destination device. When the second network device obtains a label forwarding table of the destination device through matching based on the label of the destination device and determines that the primary forwarding path corresponding to the primary forwarding information in the label forwarding table is unreachable, even if the second network device can send the packet M3 by using the backup forwarding information corresponding to the label of the destination device, the second network device does not use, based on an indication of the indication identifier B, the backup forwarding path corresponding to the backup forwarding information to send the packet M3 to the destination device.

In an embodiment, when the indication identifier B is a special label and is adjacent to the label of the second network device, the second network device may pop up the special label and the label of the second network device, to obtain the special label, and not use, based on an indication of the special label, the backup forwarding path to the destination device to send the packet M3.

After the special label and the label of the second network device are popped out, if a next-hop network device is the destination device, a top label of the label stack is the label of the destination device.

In conclusion, because the packet M3 sent by the first network device to the second network device carries the indication identifier B, the second network device can avoid, based on the indication identifier B, using the backup forwarding path to forward the packet M3. This avoids a loop problem of packet forwarding that may be caused when the packet M3 is transmitted by using the backup forwarding path, thereby avoiding network congestion or network bandwidth resource waste.

The following uses several application scenarios as examples to describe in detail a packet sending method according to an embodiment of this application.

Scenario 1

Figure 15A:
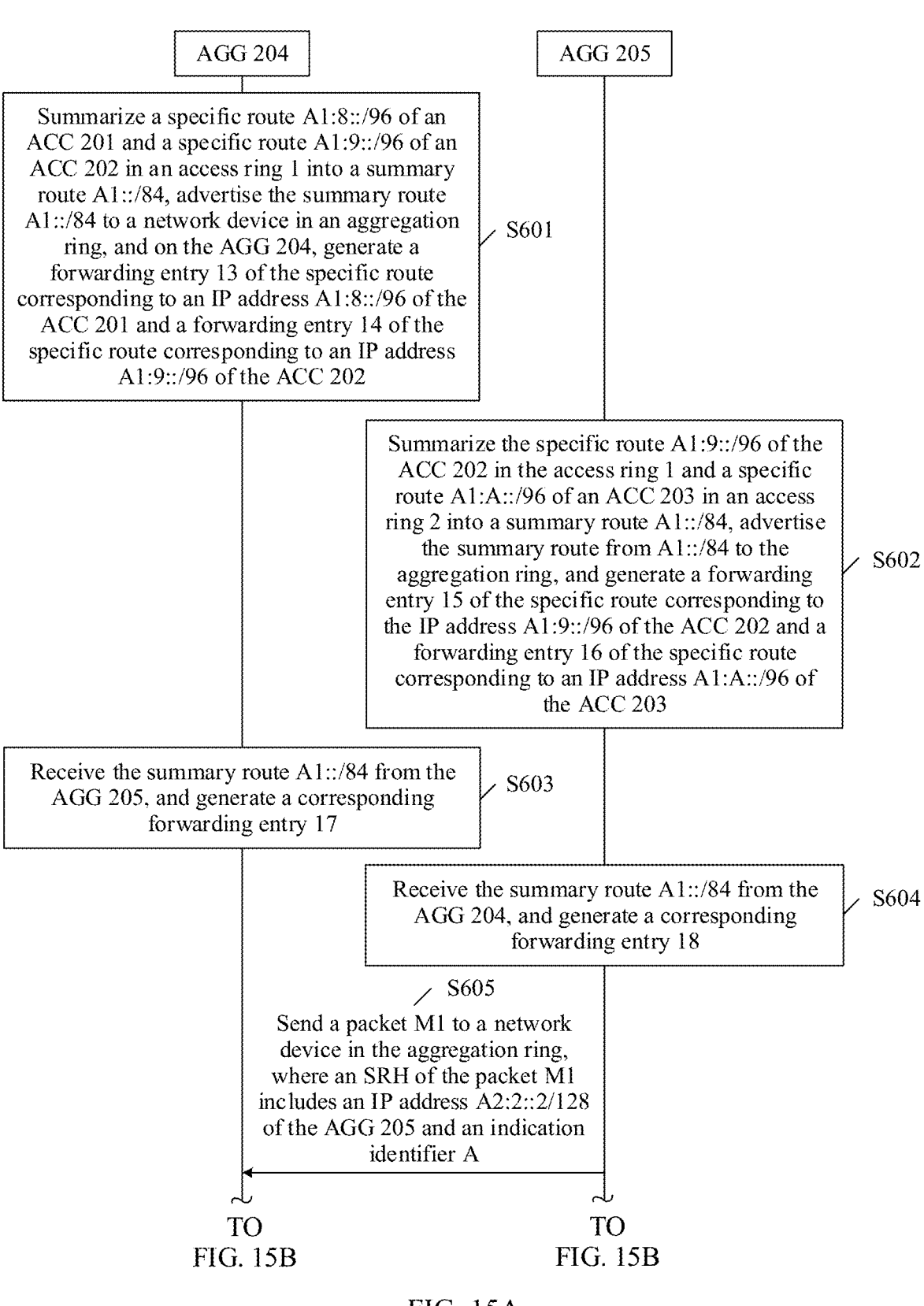
Figure 16A:
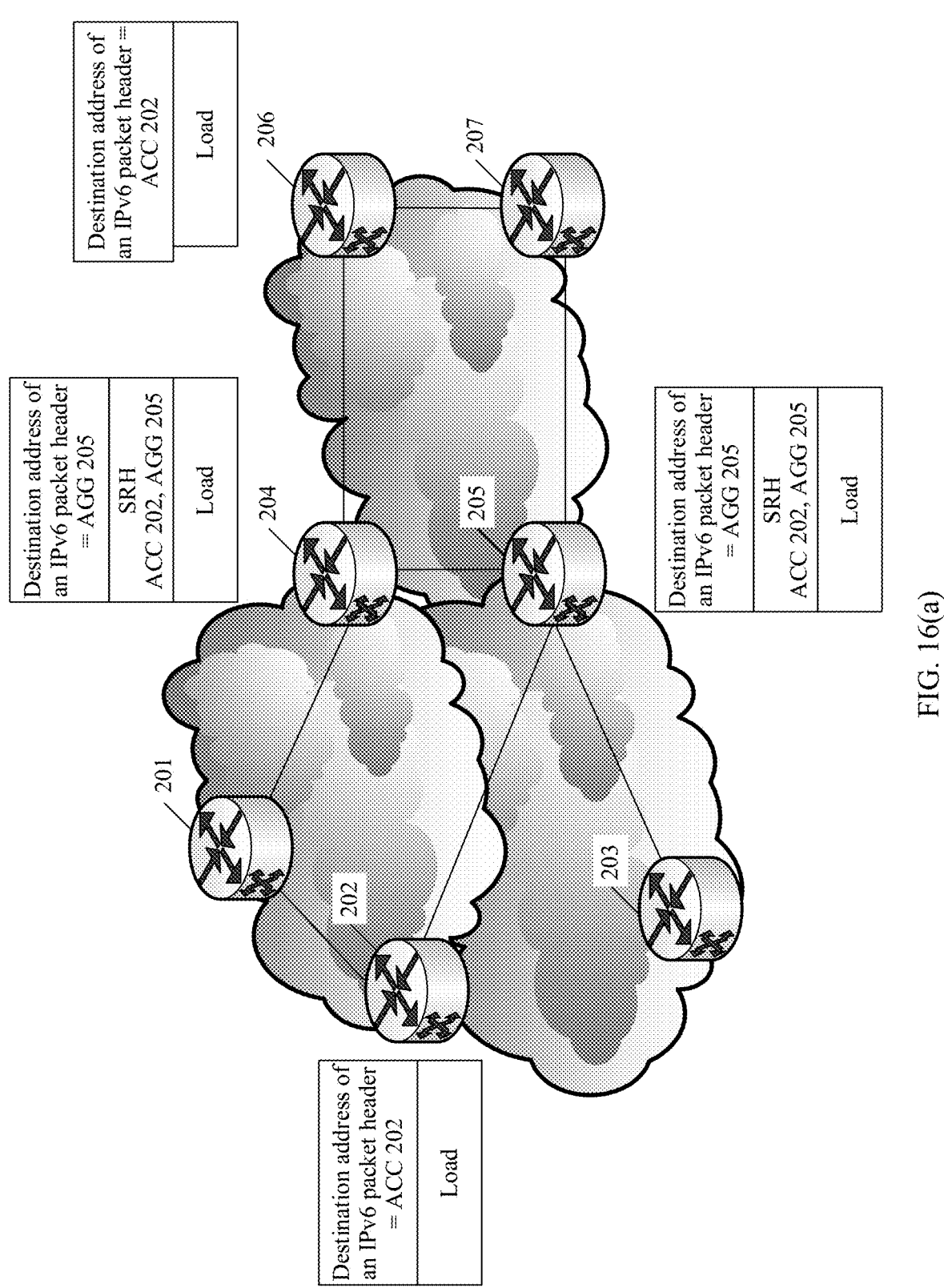
FIG. 16(a) is a schematic diagram of the network architecture in an SRv6 scenario according to an embodiment of this application.
Figure 16B:
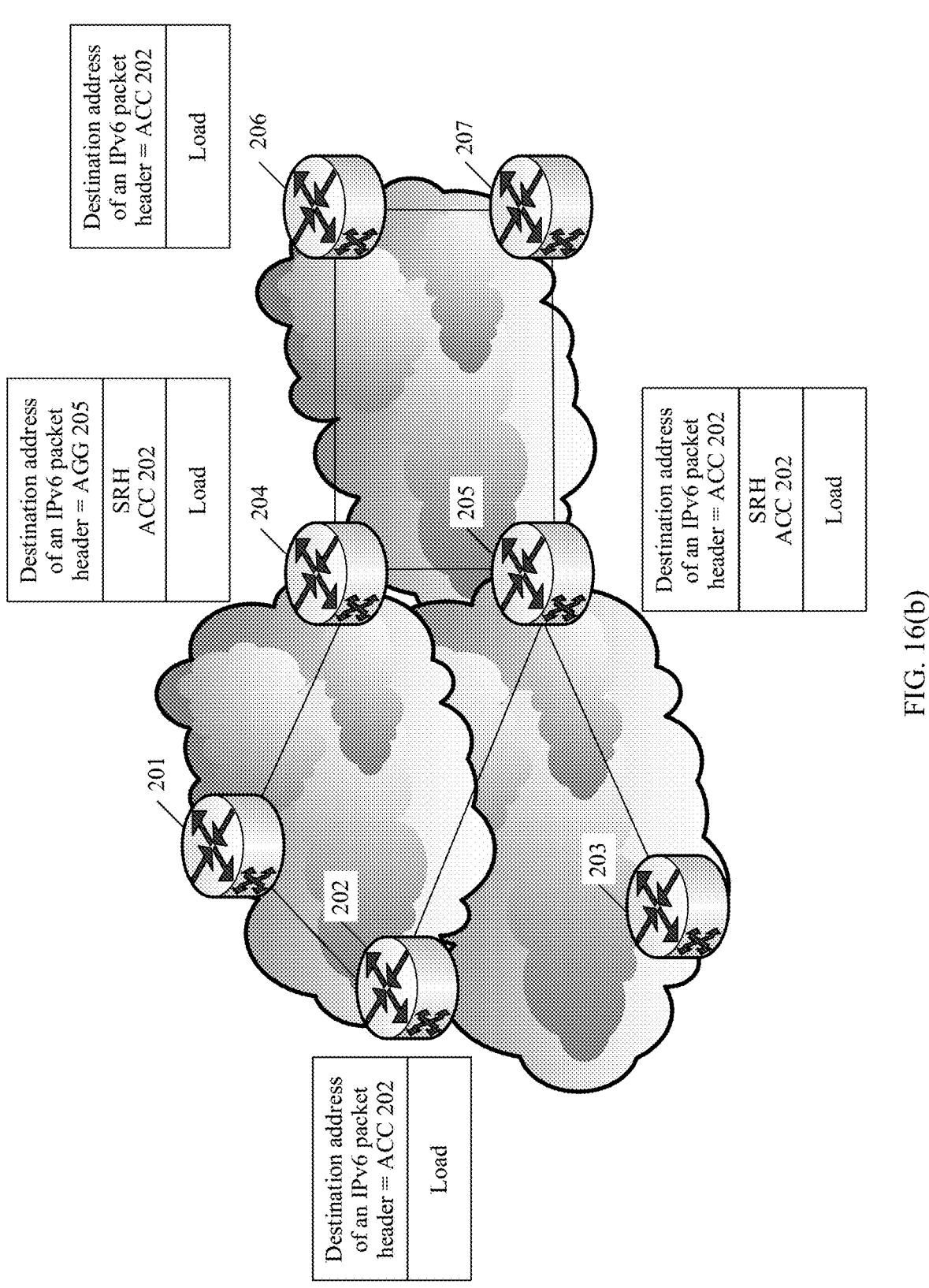
FIG. 16(b) is a schematic diagram of the network architecture in another SRv6 scenario according to an embodiment of this application.

Refer to FIG. 15A, FIG. 15B, FIG. 15C, FIG. 16(a), and FIG. 16(b). FIG. 15A, FIG. 15B, and FIG. 15C are a flowchart of a packet sending method in a network architecture shown in FIG. 16(a) and FIG. 16(b), and the network architecture shown in FIG. 16(a) and FIG. 16(b) is the same as the network architecture shown in FIG. 2.

The packet sending method includes the following operations.

S601: An AGG 204 generates a forwarding entry 13 of a specific route corresponding to an IP address A1:8::/96 of an ACC 201, and generates a forwarding entry 14 of the specific route corresponding to an IP address A1:9::/96 of an ACC 202. The AGG 204 summarizes the specific route A1:8::/96 of the ACC 201 and the specific route A1:9::/96 of the ACC 202 in an access ring 1 into a summary route A1::/84, and advertises the summary route A1::/84 to a network device in an aggregation ring.

In an embodiment of this application, the AGG 204 may be considered as the foregoing first network device. Refer to Table 5. The table includes forwarding entries generated by the AGG 204, and the forwarding entries include a forwarding entry 13 and a forwarding entry 14. The forwarding entry 13 includes the IP address A1:8::/96 of the ACC 201 and an outbound interface (indicating an identifier of this interface, which is similar below). The outbound interface is an interface of the AGG 204 on a forwarding path from the AGG 204 to the ACC 201. The forwarding entry 14 includes the IP address A1:9::/96 of the ACC 202 and an outbound interface, and the outbound interface is an interface of the AGG 204 on a forwarding path from the AGG 204 to the ACC 202. The outbound interfaces in both the forwarding entry 13 and the forwarding entry 14 each are an interface of a shortest path between the AGG 204 and the ACC 201, and the interface of the shortest path may be an outbound interface of the AGG 204 on a direct link to the ACC 201.

TABLE 5

| Identifier of a forwarding entry | Destination address | Outbound interface |
| --- | --- | --- |
| 13 | A1:8::/96 | Outbound interface of a direct link to the ACC 201 |
| 14 | A1:9::/96 | Outbound interface of a direct link to the ACC 201 |

S602: An AGG 205 generates a forwarding entry 15 of the specific route corresponding to the IP address A1:9::/96 of the ACC 202 and a forwarding entry 16 of a specific route corresponding to an IP address A1:A::/96 of an ACC 203. The AGG 205 summarizes the specific route A1:9::/96 of the ACC 202 in the access ring 1 and the specific route A1:A::/96 of the ACC 203 in an access ring 2 into a summary route A1::/84, and advertises the summary route A1::/84 to the aggregation ring.

In this embodiment of this application, the AGG 205 may be considered as the foregoing second network device.

Refer to Table 6. In the table, there are the forwarding entry 15 and the forwarding entry 16 generated by the AGG 205. The forwarding entry 15 includes the IP address A1:9::/96 of the ACC 202 and an outbound interface, and the outbound interface is an outbound interface of the AGG 205 on a direct link to the ACC 202. The forwarding entry 16 includes the IP address A1:A::/96 of the ACC 203 and an outbound interface, and the outbound interface is an outbound interface of the AGG 205 on a direct link to the ACC 203.

TABLE 6

| Identifier of a forwarding entry | Destination address | Outbound interface |
| --- | --- | --- |
| 15 | A1:9::/96 | Outbound interface of a direct link to the ACC 202 |
| 16 | A1:A::/96 | Outbound interface of a direct link to the ACC 203 |

S603: The AGG 204 receives the summary route A1::/84 from the AGG 205, and generates a corresponding forwarding entry 17.

Refer to Table 7. The forwarding entry 17 includes the summary route A1::/84 and an outbound interface, and the outbound interface may be set to null 0 or may be an outbound interface of the AGG 204 on a direct link to the AGG 205.

TABLE 7

| Identifier of a forwarding entry | Destination address | Outbound interface |
| --- | --- | --- |
| 17 | A1::/84 | Null 0; or Outbound interface of a direct link to the AGG 205 |

S604: The AGG 205 receives the summary route A1::/84 from the AGG 204, and generates a corresponding forwarding entry 18.

Refer to Table 8. The forwarding entry 18 includes the summary route A1::/84, and an outbound interface of the summary route is set to null 0 or is an outbound interface of the AGG 205 on a direct link to the AGG 204. null 0 indicates that the outbound interface is unavailable.

TABLE 8

| Identifier of a forwarding entry | IP address | Outbound interface |
| --- | --- | --- |
| 18 | A1::/84 | Null 0; or Outbound interface of a direct link to the AGG 204 |

S605: The AGG 205 sends a packet M1 to a network device in the aggregation ring. The packet M1 includes a SID of the AGG 205 and an indication identifier A, and the SID of the AGG 205 may be A2:2::2/128.

In an embodiment of this application, the SID A2:2::2/128 (namely, the IP address of the AGG 205) of the AGG 205 has a function of identifying the AGG 205. The indication identifier A is used to indicate a network device on a forwarding path to the AGG 205 to avoid using a backup forwarding path to send a packet M3 to a destination device.

In an embodiment of this application, a type of the SID of the AGG 205 may be a penultimate segment pop of the SRH (PSP) type.

S606: The AGG 204 receives the packet M1, and obtains the SID A2:2::2/128 of the AGG 205 and the indication identifier A from the packet M1.

S607: The AGG 204 generates a tunnel to the AGG 205 based on the SID A2:2::2/128 of the AGG 205.

In an embodiment of this application, the tunnel to the AGG 205 sequentially passes through the AGG 204, the RC 206, the RC 207, and the AGG 205, and the tunnel may be considered as the first forwarding path in the foregoing description.

S608: The AGG 204 generates a backup forwarding entry of the summary route A1::/84, for example, a forwarding entry 19, where the forwarding entry 19 is a backup forwarding entry of the forwarding entry 17.

Refer to Table 9. A destination address of the forwarding entry 19 is A1::/84, and the forwarding entry 19 further includes backup forwarding information and an outbound interface of a tunnel. The backup forwarding information includes a repair list (repair list), and the repair list includes the SID of the AGG 205. Optionally, the repair list may further include SIDs of other network devices than the SID of the AGG 205 on the tunnel, for example, a SID of the RC 206 and a SID of the RC 207.

TABLE 9

| Identifier of a forwarding entry | Destination address | Repair list (repair list) | Outbound interface |
|---|---|---|---|
| 19 | A1::/84 | A2:2::2/128 | Interface corresponding to a tunnel |

S609: The AGG 204 determines that the primary forwarding path to the ACC 202 is unreachable, and the AGG 204 deletes the forwarding entry 14.

The primary forwarding path from the AGG 204 to the ACC 202 is AGG 204→ACC 201→ACC 202, and the primary forwarding path may be considered as the second forwarding path in the foregoing description. When the primary forwarding path is faulty, the AGG 204 may delete the forwarding entry 14.

S610: The AGG 204 receives a packet M2 from the RC 206, where the packet M2 includes the IP address A1:9::/96 of the ACC 202.

In this embodiment of this application, the ACC 202 may be considered as the foregoing destination device.

Specifically, the packet M2 includes an IPv6 packet header and a payload, the IPv6 packet header includes a destination address, and the destination address is the IP address A1:9::/96 of the ACC 202.

S611: Because the forwarding entry 14 is deleted, based on the IP address A1:9::/96 of the ACC 202, the AGG 204 fails to obtain a specific route through matching, but can obtain the summary route A1::/84 through matching, that is, can obtain the forwarding entry 17 and the forwarding entry 19 through matching.

S612: When the AGG 204 determines that the outbound interface in the forwarding entry 17 is null 0, or when the AGG 204 determines that the outbound interface in the forwarding entry 17 is the outbound interface of the direct link between the AGG 204 and the AGG 205, but the direct link between the AGG 204 and the AGG 205 is faulty, the AGG 204 uses the forwarding entry 19 to forward the packet M2.

S613: The AGG 204 adds the SID A1:9::/96 of the ACC 202 and the SID A2:2::2/128 of the AGG 205 to the SID list in an SRH of the packet M2, adds an indication identifier B to a flags field of the SRH of the packet M2, and modifies a value of a destination address field of the IPv6 packet header of the packet M2 to the IP address of the AGG 205, to obtain a packet M3.

That is, refer to FIG. 16(*a*), and a SID list of the packet M3 includes both the SID of the AGG 205 and the SID of the ACC 202. The SID of the ACC 202 is stored in a location of a segment list [0] in the SRH header, and the SID of the AGG 205 is stored in a location of a segment list [1] in the SRH header. Segments Left is set to 1.

S614: The AGG 204 sends the packet M3 to the AGG 205 based on the interface corresponding to the tunnel.

S615: The AGG 205 receives the packet M3, and determines, based on the IP address A1:9::/96 of the ACC 202 in the packet M3, whether the primary forwarding path to the ACC 202 is reachable. If the primary forwarding path to the ACC 202 is reachable, the AGG 205 sends the packet M3 to the ACC 202 by using the primary forwarding path. If the primary forwarding path to the ACC 202 is unreachable, the AGG 205 avoids, based on the indication B, using the backup path to forward the packet M3.

In an embodiment, after receiving the packet M3, the AGG 205 determines that a destination address is the address of the AGG 205; then, a value of Segments Left in the packet M3 is reduced by 1 to be 0; and the Segment List [0], namely, the IP address A1:9::/96 of the ACC 202 replaces the destination address in the IPv6 packet header. The AGG 205 determines, based on the IP address A1:9::/96 of the ACC 202 in the destination address, whether the forwarding entry 15 can be obtained through matching, and if the forwarding entry 15 can be obtained through matching, sends the packet M3 to the ACC 202 through the outbound interface of the direct link between the AGG 205 and the ACC 202. In addition, because the SID of the ACC 202 is a PSP-type End SID, an SRH header of the packet M3 is popped before the packet M3 is sent. Before forwarding the packet, the ACC 202 modifies the destination address in the IPv6 packet header to the IP address of the ACC 202. If the matching fails, or if the matching succeeds, but it is determined that the direct link between the AGG 205 and the ACC 202 is unreachable, the AGG 205 obtains the forwarding entry 18 through matching based on the IP address of the ACC 202. Regardless of whether the outbound interface included in the forwarding entry 18 is null 0 or the outbound interface of the direct link between the AGG 205 and the AGG 204, the AGG 205 no longer uses the entry 18 to forward the packet, but directly discards the packet M3. Alternatively, when the AGG 205 obtains, through matching based on the IP address of the ACC 202, the outbound interface null 0 corresponding to the summary route A1::/84, it indicates that the primary forwarding path corresponding to the summary route A1::/84 is unreachable. Therefore, even if the backup forwarding path corresponding to the summary route A1::/84 exists, for example, AGG 205→RC 207→RC 206→AGG 204, the AGG 205 does not use the backup forwarding path to forward the packet, thereby avoiding forming a loop between the AGG 205 and the AGG 204.

In some embodiments, when the type of the SID of the AGG 205 is an ultimate segment pop of the SRH (Ultimate Segment Pop of the SRH, UPS) type, the AGG 205 does not need to pop the SRH before sending the packet M3.

Because the packet M3 carries the indication identity B, the AGG 205 cannot return the packet M3 to the AGG 204 when the primary forwarding path to the ACC 202 is unreachable, thereby avoiding a problem of resource waste or network congestion.

In some embodiments, a case in which there is no direct link between the AGG 204 and the AGG 205 is similar to a case in which the direct link between the AGG 204 and the AGG 205 is faulty. Details are not described herein again. In some embodiments, as shown in FIG. 16(*b*), the packet M3 may not include the SID of the AGG 205, so that a length of the SRH is reduced, and network resources occupied during packet forwarding can be reduced.

Scenario 2

Figure 17A:
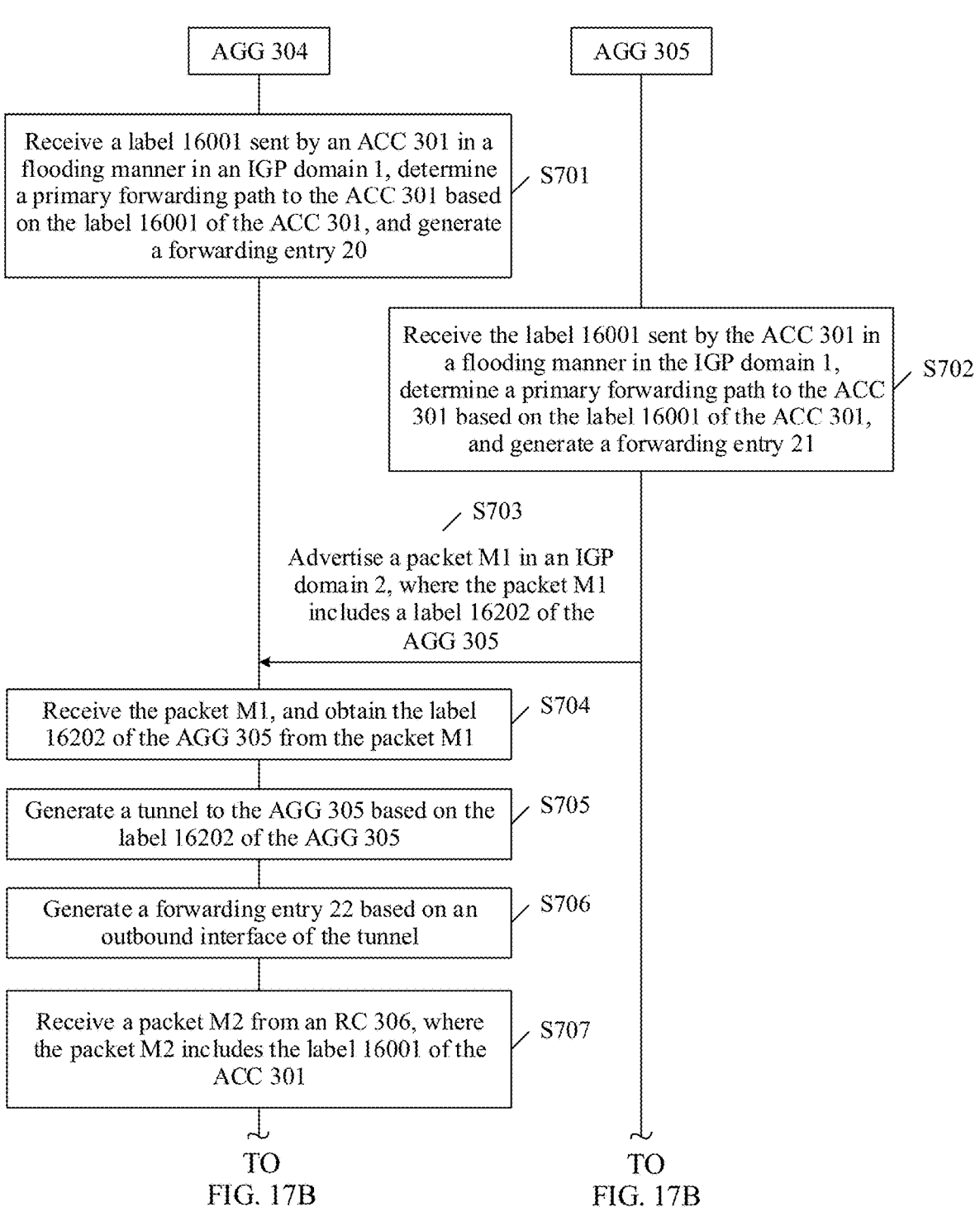
Figure 18:
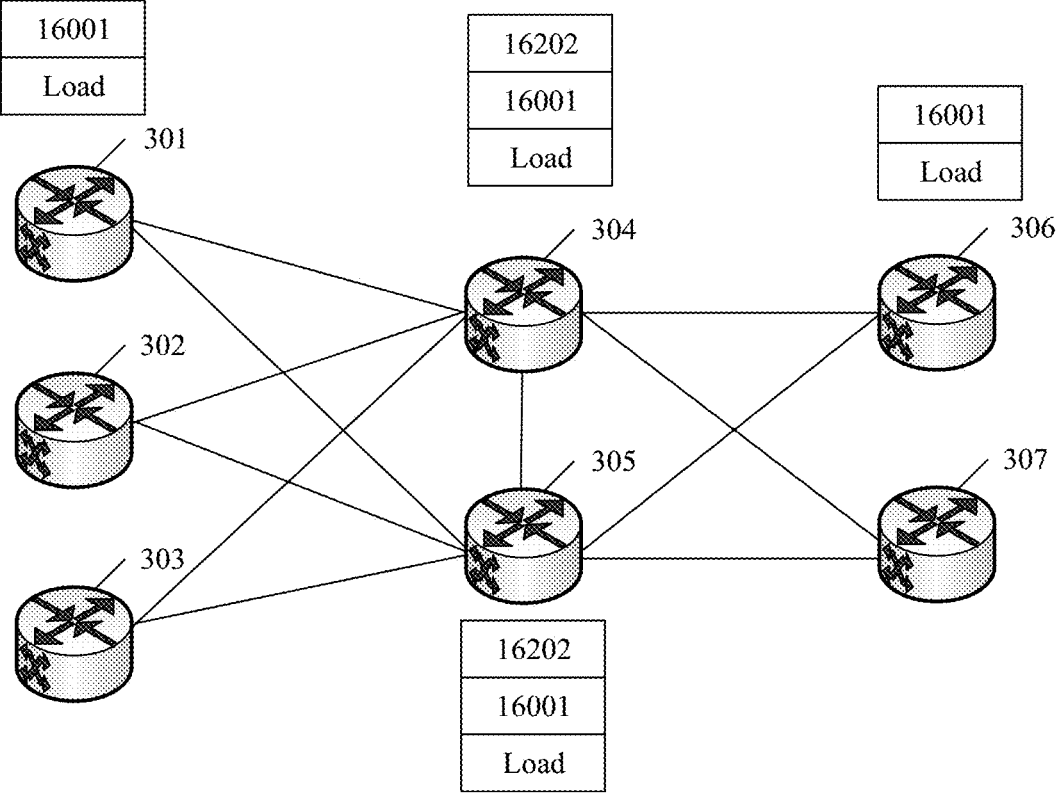
FIG. 18 is a schematic diagram of the network architecture in an SR-MPLS scenario according to an embodiment of this application.

Refer to FIG. 17A, FIG. 17B, and FIG. 18. FIG. 17A and FIG. 17B are a flowchart of a packet sending method in a network architecture shown in FIG. 18. The network architecture shown in FIG. 18 is the same as the network architecture shown in FIG. 3.

The packet sending method includes the following operations.

S701: An AGG 304 receives a label 16001 sent by an ACC 301 in a flooding manner in an IGP domain 1, determines a primary forwarding path to the ACC 301 based on the label 16001 of the ACC 301, and generates a forwarding entry 20.

In this embodiment of this application, the AGG 304 may be considered as the foregoing first network device.

Refer to Table 10. The forwarding entry 20 includes the label 16001 of the ACC 301 and an outbound interface, and the outbound interface is an outbound interface of the AGG 304 on a direct link to the ACC 301.

TABLE 10

| Identifier of a forwarding entry | Label | Outbound interface |
|---|---|---|
| 20 | 16001 | Outbound interface of a direct link to the ACC 301 |

S702: An AGG 305 receives the label 16001 sent by the ACC 301 in a flooding manner in the IGP domain 1, determines a primary forwarding path to the ACC 301 based on the label 16001 of the ACC 301, and generates a forwarding entry 21.

In an embodiment of this application, the AGG 305 may be considered as the foregoing second network device. Refer to Table 11. The forwarding entry 21 includes the label 16001 of the ACC 301 and an outbound interface, and the outbound interface is an outbound interface of the AGG 305 on a direct link to the ACC 301.

TABLE 11

| Identifier of a forwarding entry | Label | Outbound interface |
|---|---|---|
| 21 | 16001 | Outbound interface of a direct link to the ACC 301 |

S703: The AGG 305 advertises a packet M1 in an IGP domain 2, where the packet M1 includes a label 16202 of the AGG 305.

S704: The AGG 304 receives the packet M1, and obtains the label 16202 of the AGG 305 from the packet M1.

In an embodiment of this application, the label 16202 is not only used to identify the AGG 305, but also has an indication function of the indication identifier A in the embodiment shown in FIG. 5, that is, the label 16202 can indicate that the AGG 305 has a capability of avoiding using a backup forwarding path to send a packet.

S705: The AGG 304 generates, based on the label 16202 of the AGG 305, a tunnel to the AGG 305.

Because a bandwidth of a link between an access device and an aggregation device is far less than a bandwidth of a link between the aggregation device and a regional core device, the aggregation device may generate a backup forwarding path to the access device, and the backup forwarding path passes through the regional core device.

In an embodiment of this application, a tunnel between the AGG 304 and the AGG 305 may pass through an RC 306, or may pass through an RC 307. In other words, the tunnel may be a tunnel 1: AGG 304→RC 306→AGG 305, or may be a tunnel 2: AGG 304→RC 307→AGG 305.

S706: The AGG 304 generates a forwarding entry 22 based on an outbound interface of the tunnel.

Refer o Table 12. The forwarding entry 22 includes the label 16001 of the ACC 301, the label 16202 of the AGG 305, and an outbound interface, and the outbound interface is an outbound interface of the tunnel.

TABLE 12

| Identifier of a forwarding entry | Incoming label | Outgoing label | Outbound interface |
|---|---|---|---|
| 22 | 16001 | 16202 | Outbound interface of a tunnel |

S707: The AGG 304 receives a packet M2 from the RC 306, where the packet M2 includes the label 16001 of the ACC 301.

That is, the packet M2 needs to arrive at the ACC 301. In other words, in this embodiment of this application, the ACC 301 may be considered as the foregoing destination device.

S708: If the AGG 304 determines, based on the label 16001 of the ACC 301, that the primary forwarding path from the AGG 304 to the ACC 301 is unreachable, the AGG 304 encapsulates the label 16202 of the AGG 305 in the packet M2, to obtain a packet M3.

In an embodiment, although the AGG 304 obtains the forwarding entry 20 through matching based on the label 16001 of the ACC 301, when the AGG 304 determines that the primary forwarding path to the ACC 301 (namely, the direct link to the ACC 301, where the direct link may be considered as the second forwarding path in the foregoing description) is faulty, the AGG 304 sends the packet M2 by using a backup forwarding path. The backup forwarding path is a forwarding path from the AGG 304 to the AGG 305, and may be considered as the foregoing first forwarding path. Specifically, the AGG 304 obtains a forwarding entry 22 through matching based on the label 16001 of the ACC 301, and obtains the outbound interface of the tunnel and the label 16202 of the AGG 305. Further, the AGG 304 encapsulates the label 16202 of the AGG 305 in the packet M2, to obtain the packet M3. The label 16202 of the AGG 305 may be encapsulated at the top of a label stack in the packet M3.

Optionally, in this embodiment of this application, after popping out the label 16001 of the packet M2, the AGG 304 may press the label 16001 and the label 16202 to obtain the packet M3.

S709: The AGG 304 sends the packet M3 to the AGG 305 through the outbound interface of the tunnel.

S710: The AGG 305 receives the packet M3, pops up the label 16202 of the AGG 305, obtains a forwarding entry 21 through matching based on the label 16001 of the ACC 301 in the packet M3, and determines whether the primary forwarding path to the ACC 301 is faulty. If the primary forwarding path to the ACC 301 is not faulty, the AGG 305 sends the packet M3 to the ACC 301. If it is determined that the primary forwarding path to the ACC 301 is faulty, the AGG 305 discards the packet M3 based on an indication function of the label 16202 of the AGG 305, namely, a meaning of avoiding using the backup path to forward the packet M3.

Optionally, the backup forwarding path from the AGG 305 to the ACC 301 is AGG 305→AGG 304→ACC 301.

In an embodiment of this application, the primary forwarding path from the AGG 305 to the ACC 301 is the direct link between the AGG 305 and the ACC 301. When the primary forwarding path is faulty, regardless of whether the AGG 305 has a forwarding entry of the backup forwarding path corresponding to the label 16001 of the ACC 301, the AGG 305 discards the packet M3, to avoid a problem of resource waste or network congestion.

Scenario 3

Figure 19:
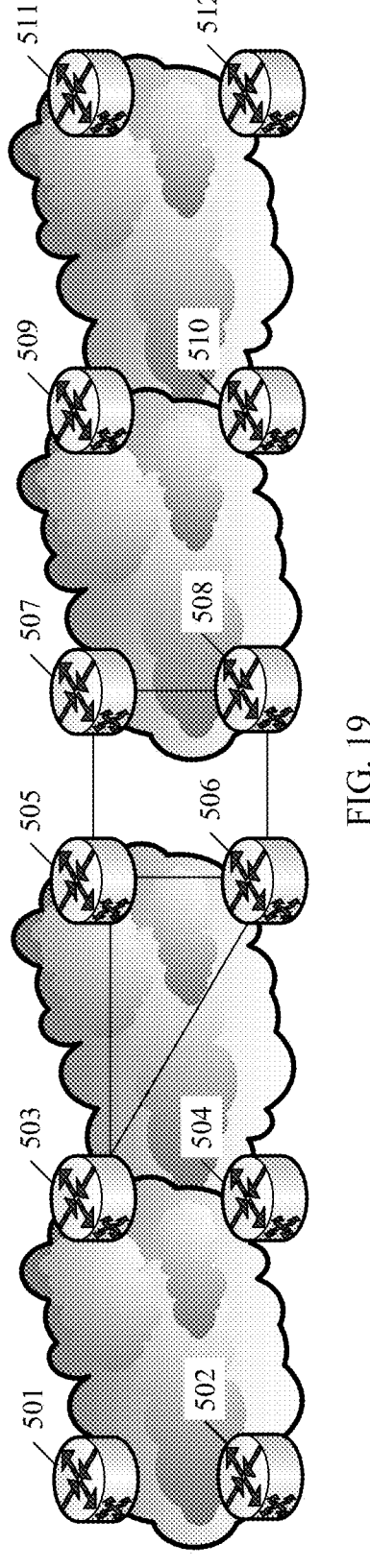
FIG. 19 is a schematic diagram of a cross-domain network architecture according to an embodiment of this application.

FIG. 19 is a schematic diagram of a cross-domain network architecture. In this figure, the network architecture includes an ACC 501, an ACC 502, an AGG 503, an AGG 504, an RC 505, and an RC 506 that are in an IGP domain, and an autonomous system boundary router (Autonomous System Boundary Router, ASBR) 507, an ASBR 508, a provider (P) device 509, a P device 510, an ASBR 511, and an ASBR 512 that are in an external border gateway protocol (EBGP) domain.

The ACC 501, the ACC 502, the AGG 503, and the AGG 504 belong to an IGP domain 1. The AGG 503, the AGG 504, the RC 505, and the RC 506 belong to an IGP domain 2. The ASBR 507, the ASBR 508, the P device 509, and the P device 510 belong to an EBGP domain 1. The P device 509, the P device 510, the ASBR 511, and the ASBR 512 belong to an EBGP domain 2.

The AGG 503 is connected to the RC 505 and the RC 506, the RC 506 is connected to the ASBR 507, the RC 506 is further connected to the ASBR 508, and the ASBR 508 is further connected to the ASBR 507.

The RC 505 receives routing information of the ASBR 511 from the ASBR 507, and determines that a next-hop network device of a primary forwarding path from the RC 505 to the ASBR 511 is the ASBR 507, and an outbound interface is an interface of a direct link between the RC 505 and the ASBR 507. In addition, the RC 505 may further receive routing information of the ASBR 511 from the RC 506, and determine that a next-hop network device of a backup forwarding path from the RC 505 to the ASBR 511 is the AGG 503, and an outbound interface is an outbound interface of a direct link between the RC 505 and the AGG 503.

After the RC 505 receives a packet whose destination device is the ASBR 511 from the AGG 503, if the primary forwarding path to the ASBR 511 is faulty or the ASBR 507 is faulty, the RC 505 may send the packet to the AGG 503, and the AGG 503 sends the packet to the RC 506, so that the RC 506 can send the packet to the destination device ASBR 511 by using the ASBR 508.

However, if in a conventional manner, in a case of a failure between the RC 506 and the ASBR 508, the RC 506 returns the packet to the RC 505, thereby forming a loop, resulting in resource waste and network congestion.

Figure 20A:
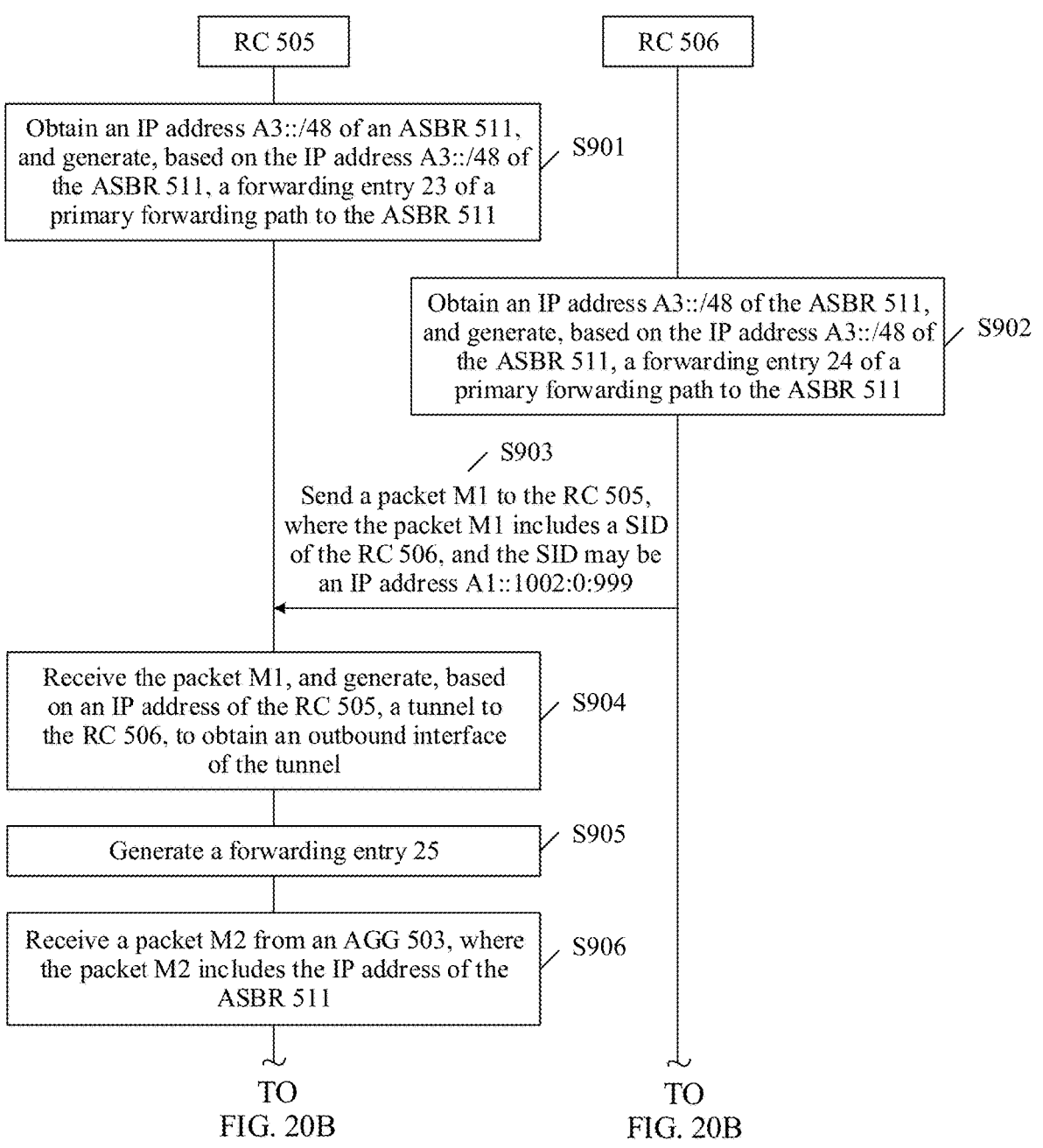

The network architecture shown in FIG. 19 is used as an example. FIG. 20A and FIG. 20B are a flowchart of a packet sending method in the network architecture.

The packet sending method includes the following operations.

S901: The RC 505 obtains an IP address A3::/48 of the ASBR 511, and generates, based on the IP address A3::/48 of the ASBR 511, a forwarding entry 23 of a primary forwarding path to the ASBR 511.

In this embodiment of this application, the RC 505 may be considered as the foregoing first network device.

A next-hop network device on the primary forwarding path from the RC 505 to the ASBR 511 is the ASBR 507. Refer to Table 13. The forwarding entry 23 includes the IP address A3::/48 of the ASBR 511 and an outbound interface, and the outbound interface is an outbound interface of a direct link to the ASBR 507.

TABLE 13

| Identifier of a forwarding entry | Destination address | Outbound interface |
|---|---|---|
| 23 | A3::/48 | Outbound interface of a direct link to the ASBR 507 |

902: The RC 506 obtains the IP address A3::/48 of the ASBR 511, and generates, based on the IP address A3::/48 of the ASBR 511, a forwarding entry 24 of a primary forwarding path to the ASBR 511.

In this embodiment of this application, the RC 506 may be considered as the foregoing second network device.

A next-hop network device on the primary forwarding path from the RC 506 to the ASBR 511 is the ASBR 508. Refer to Table 14. The forwarding entry 24 includes the IP address A3::/48 of the ASBR 511 and an outbound interface, and the outbound interface is an outbound interface of a direct link to the ASBR 508.

TABLE 14

| Identifier of a forwarding entry | Destination address | Outbound interface |
|---|---|---|
| 24 | A3::/48 | Outbound interface of a direct link to the ASBR 508 |

S903: The RC 506 sends a packet M1 to the RC 505, where the packet M1 includes a SID of the RC 506, and the SID may be an IP address A1::1002:0:999.

The SID A1::1002:0:999 is not only used as an IP address of the RC 506 to identify the RC 506, but also may be used as the indication identifier B in the embodiment shown in FIG. 5 to have an indication function indicating that the RC 506 has a capability of supporting avoiding using a backup forwarding path to forward a packet.

S904: The RC 505 receives the packet M1, and generates, based on the IP address of the RC 505, a tunnel to the RC 506, to obtain an outbound interface of the tunnel.

Network devices through which the tunnel passes may be the RC 505, the AGG 503, and the RC 506, and the tunnel may be considered as the foregoing first forwarding path.

S905: The RC 505 generates a forwarding entry 25.

Refer to Table 15. The forwarding entry 25 includes the IP address of the ASBR 511, the IP address of the RC 506, and an outbound interface.

TABLE 15

| Identifier of a forwarding entry | Destination address | Repair list | Outbound interface |
|---|---|---|---|
| 25 | A3::/48 | A1::1002:0:999 | Outbound interface of a tunnel |

S906: The RC 505 receives a packet M2 from the AGG 503, where the packet M2 includes the IP address of the ASBR 511.

In this embodiment of this application, the ASBR 511 may be considered as the foregoing destination device.

S907: The RC 505 determines, based on the IP address of the ASBR 511, that the primary forwarding path (namely, the outbound interface of the direct link to the ASBR 507) to the ASBR 511 is faulty (for example, the forwarding entry 23 fails to be obtained through matching), and then the RC 505 obtains the forwarding entry 25 through matching based on the IP address of the ASBR 511, to obtain the IP address A1::1002:0:999 of the RC 506 and an identifier of the outbound interface of the tunnel.

If the primary forwarding path to the ASBR 511 is not faulty, the RC 505 may send the packet M2 to the ASBR 507, so that the ASBR 507 sends the packet M2 to the ASBR 511 through the P device 509.

S908: The RC 505 adds an indication identifier B to the packet M2, to obtain a packet M3, where the indication identifier B is A1::1002:0:999.

In an embodiment of this application, a value of the indication identifier B is the same as a value of the indication identifier A. In addition, the indication identity B is not only used to identify the IP address of the RC 506, but also used to indicate the RC 506 to avoid using the backup path to send the packet M3 to the ASBR 511.

The packet M3 includes an IPv6 packet header and an SRH. The IPv6 packet header includes a destination address, namely, the IP address A1::1002:0:999 of the RC 506. The SRH includes an IP address A3::/48 of the ASBR 511 and a SID A1::1002:0:999 of the RC 506.

S909: The RC 505 sends the packet M3 to the RC 506.

S910: The RC 506 receives the packet M3, and obtains the forwarding entry 24 through matching based on the IP address A3::/48 of the ASBR 511 in the packet M3, where the forwarding entry 24 corresponds to the primary forwarding path to the ASBR 511. If the matching succeeds, the packet M3 is sent by using the primary forwarding path. If the matching fails, even if the RC 506 has a backup forwarding path to the ASBR 511, the packet M3 is discarded.

In an embodiment, after receiving the packet M3, the RC 506 replaces the destination address in a header of the M3 packet with the IP address A3::/48 of the ASBR 511, and obtains the forwarding entry 24 through matching based on the IP address A3::/48 of the ASBR 511.

The primary forwarding path from the RC 506 to the ASBR 511 is RC 506→ASBR 508→ASBR 510→P device 509→ASBR 511. The backup forwarding path from the RC 506 to the ASBR 511 may be, for example, RC 506→RC 505→ASBR 507→P device 509→ASBR 511.

It should be noted that the descriptions of the indication identifier A and the indication identifier B in the foregoing three application scenarios do not constitute a limitation on the technical solutions of this application, and persons skilled in the art may perform a design based on the descriptions in the embodiment shown in FIG. 5.

Figure 21:
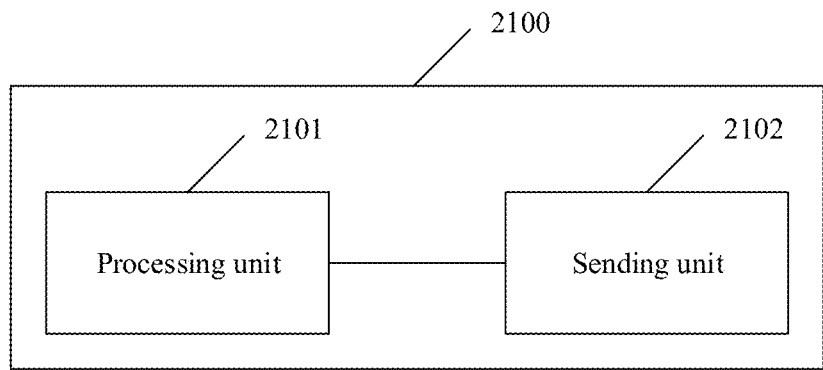
FIG. 21 is a schematic diagram of a structure of a network device 2100 according to an embodiment of this application.

FIG. 21 is a schematic diagram of a possible structure of the network device in the foregoing embodiments. The network device 2100 may implement functions of the first network device in the embodiment shown in FIG. 5. Alternatively, the network device 2100 may implement functions of the AGG 204 in the embodiment shown in FIG. 15A, FIG. 15B, and FIG. 15C, the AGG 304 in the embodiment shown in FIG. 17A and FIG. 17B, or the RC 505 in the embodiment shown in FIG. 20A and FIG. 20B. Refer to FIG. 21. The network device 2100 includes a processing unit 2101 and a sending unit 2102. These units may perform corresponding functions of the first network device in the foregoing method examples. The processing unit 2101 is configured to support the network device 2100 in performing S503 to S505 in FIG. 5. The sending unit 2102 is configured to support the network device 2100 in performing S506 in FIG. 5, and/or another process performed by the first network device in the technology described in this specification. For example, the processing unit 2101 is configured to perform various processing operations performed by the first network device in the foregoing method embodiments; and the sending unit 2102 is configured to perform a packet sending operation performed by the first network device in the foregoing method embodiments. For example, the processing unit 2101 is configured to obtain a first packet destined for a destination device, and add a first indication identifier to the first packet to generate a second packet. The first indication identifier is used to indicate a second network device to avoid using a backup forwarding path from the second network device to the destination device to send the second packet to the destination device. The sending unit 2102 is configured to send the second packet to the second network device by using a first forwarding path. For a specific execution process, refer to detailed descriptions of corresponding operations in the embodiment shown in FIG. 5, FIG. 15A to FIG. 15C, FIG. 17A and FIG. 17B, or FIG. 20A and FIG. 20B. Details are not described herein again.

It should be noted that, in this embodiment of this application, division into the units is an example, and is merely a logical function division. In actual implementation, another division manner may be used. Functional units in embodiments of this application may be integrated into one processing unit, or each of the units may exist alone physically, or two or more units are integrated into one unit. For example, in the embodiment, the processing unit and the sending unit may be a same unit or different units. The integrated unit may be implemented in a form of hardware, or may be implemented in a form of a software functional unit.

Figure 22:
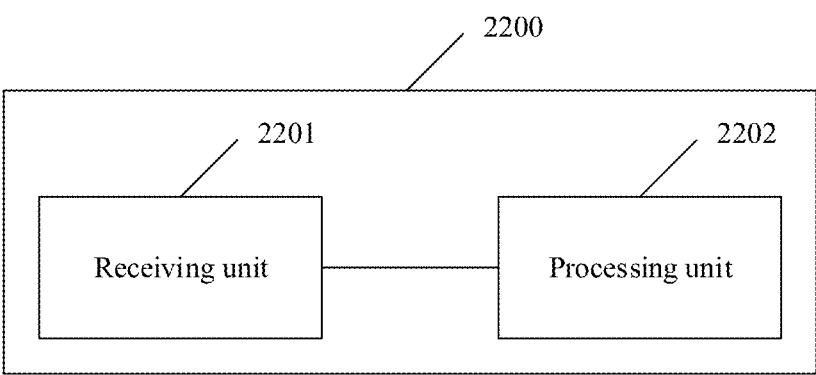
FIG. 22 is a schematic diagram of a structure of a network device 2200 according to an embodiment of this application.

FIG. 22 is a schematic diagram of a possible structure of the network device in the foregoing embodiments. The network device 2200 may implement functions of the second network device in the embodiment shown in FIG. 5. Alternatively, the network device 2200 may implement functions of the AGG 205 in the embodiment shown in FIG. 15A, FIG. 15B, and FIG. 15C, the AGG 305 in the embodiment shown in FIG. 17A and FIG. 17B, or the RC 506 in the embodiment shown in FIG. 20A and FIG. 20B. Refer to FIG. 22. The network device 2200 includes a receiving unit 2201 and a processing unit 2202. These units may perform corresponding functions of the second network device in the foregoing method examples. The receiving unit 2201 is configured to support the network device 2200 in performing S507 in FIG. 5. The processing unit 2202 is configured to support the network device 2200 in performing S508 and S509 in FIG. 5. For example, the receiving unit 2201 is configured to perform a packet receiving operation performed by the second network device in the foregoing method embodiments, and the processing unit 2203 is configured to perform various packet processing operations performed by the second network device in the foregoing method embodiments. For example, the receiving unit 2201 is configured to receive a first packet destined for a destination device. The first packet comes from a first network device, and the first packet includes a first indication identifier. The processing unit 2202 is configured to: determine that a primary forwarding path from the second network device to the destination device is unreachable; and in response to determining that the primary forwarding path is unreachable, avoid, based on an indication of the first indication identifier, using a backup forwarding path to send the first packet to the destination device. The backup forwarding path is a path from the second network device to the destination device. For a specific execution process, refer to detailed descriptions of corresponding operations in the embodiment shown in FIG. 5, FIG. 15A to FIG. 15C, FIG. 17A and FIG. 17B, or FIG. 20A and FIG. 20B. Details are not described herein again.

Figure 23:
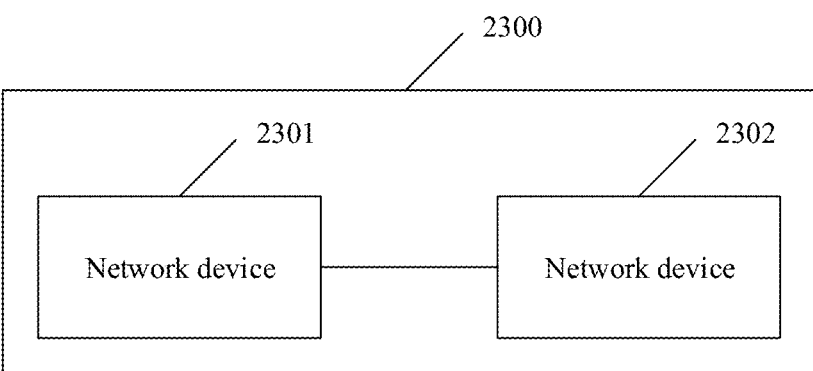
FIG. 23 is a schematic diagram of a structure of a packet sending system 2300 according to an embodiment of this application.

Refer to FIG. 23. An embodiment of the present disclosure provides a packet processing system 2300. The system 2300 is configured to implement the packet processing method in the foregoing method embodiments. The system 2300 includes a network device 2301 and a network device 2302. The network device 2301 may implement functions of the first network device in the embodiment shown in FIG. 5 or functions of the network device 2100 in FIG. 21. The network device 2302 may implement functions of the second network device in the embodiment shown in FIG. 5 or functions of the network device 2200 in FIG. 22. The network device 2301 may further implement functions of the AGG 204 in the embodiment shown in FIG. 15A, FIG. 15B, and FIG. 15C, the AGG 304 in the embodiment shown in FIG. 17A and FIG. 17B, or the RC 505 in the embodiment shown in FIG. 20A and FIG. 20B. The network device 2301 may further implement functions of the AGG 205 in the embodiment shown in FIG. 15A, FIG. 15B, and FIG. 15C, the AGG 305 in the embodiment shown in FIG. 17A and FIG. 17B, or the RC 506 in the embodiment shown in FIG. 20A and FIG. 20B. For a specific execution process, refer to detailed descriptions of corresponding operations in the embodiment shown in FIG. 5, FIG. 15A to FIG. 15C, FIG. 17A and FIG. 17B, or FIG. 20A and FIG. 20B. Details are not described herein again.

Figure 24:
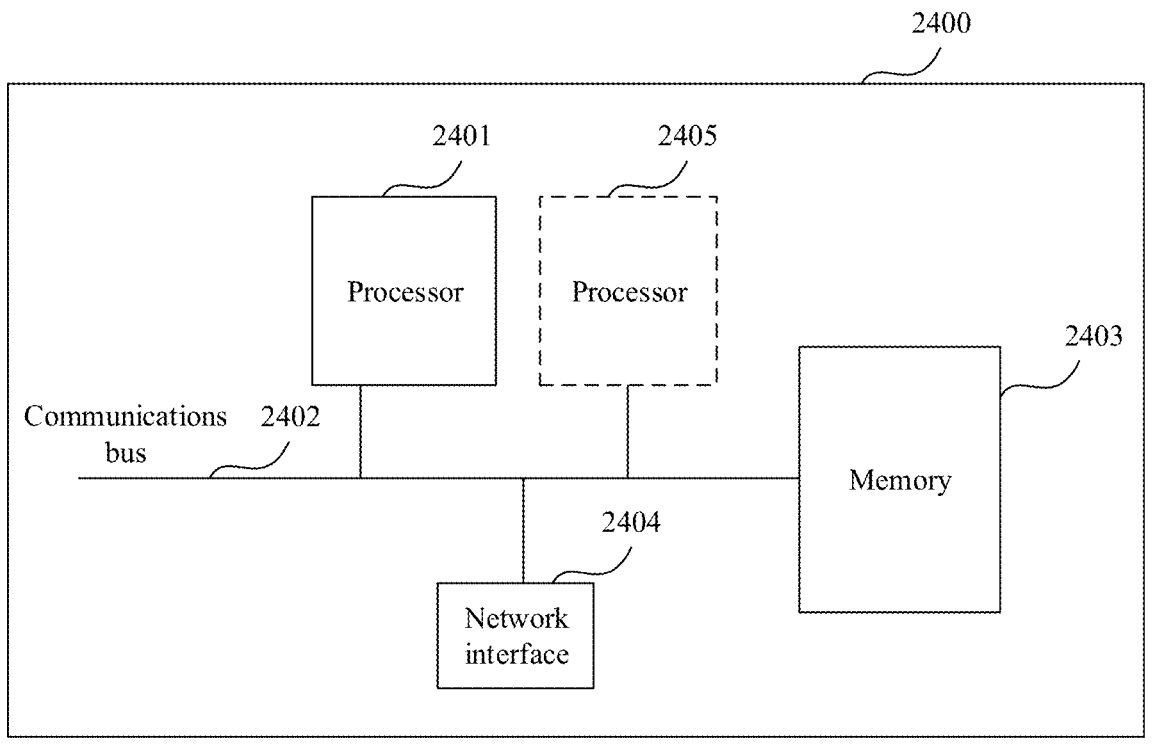
FIG. 24 is a schematic diagram of a structure of a device 2400 according to an embodiment of this application.

FIG. 24 is a schematic diagram of a structure of a device 2400 according to an embodiment of this application. The network device 2100 in FIG. 21 and the network device 2200 in FIG. 22 may be implemented by using the device shown in FIG. 24. Refer to FIG. 24. The device 2400 includes at least one processor 2401, a communications bus 2402, and at least one network interface 2404. Optionally, the device 2400 may further include a memory 2403.

The processor 2401 may be a general-purpose central processing unit (CPU), an application-specific integrated circuit (ASIC), or one or more integrated circuits (ICs) for controlling program execution of the solutions of this application. The processor may be configured to process a packet, to implement the packet sending method provided in the embodiments of this application.

For example, when the first network device in FIG. 5 is implemented by using the device shown in FIG. 24, the processor may be configured to obtain a first packet destined for a destination device, and add a first indication identifier to the first packet to generate a second packet. The first indication identifier is used to indicate a second network device to avoid using a backup forwarding path from the second network device to the destination device to send the second packet to the destination device. For specific function implementation, refer to a processing part corresponding to the first network device in the method embodiments. For another example, when the second network device in FIG. 5 is implemented by using the device shown in FIG. 24, the processor may be configured to determine that a primary forwarding path from the second network device to a destination device is unreachable. In response to determining that the primary forwarding path is unreachable, the processor avoids, based on an indication of a first indication identifier, using a backup forwarding path to send a first packet to the destination device. The backup forwarding path is a path from the second network device to the destination device. For specific function implementation, refer to the processing part of the second network device in the method embodiments.

The communications bus 2402 is configured to transmit information between the processor 2401, the network interface 2404, and the memory 2403.

The memory 2403 may be a read-only memory (ROM) or another type of static storage device that may store static information and instructions. The memory 2403 may alternatively be a random access memory (RAM) or another type of dynamic storage device that may store information and instructions, or may be a compact disc read-only memory (CD-ROM) or another optical disc storage, an optical disc storage (including a compact disc, a laser disc, an optical disc, a digital versatile disc, a Blu-ray disc, and the like), a disk storage medium or another magnetic storage device, or any other medium that can be configured to carry or store expected program code in a form of an instruction or a data structure and that can be accessed by a computer. However, the memory 2403 is not limited thereto. The memory 2403 may exist independently, and be connected to the processor 2401 by using the communications bus 2402. Alternatively, the memory 2403 may be integrated with the processor 2401.

In an embodiment, the memory 2403 is configured to store program code or instructions for executing the solutions of this application, and the processor 2401 controls the execution. The processor 2401 is configured to execute the program code or the instructions stored in the memory 2403. The program code may include one or more software modules. Optionally, the processor 2401 may alternatively store the program code or the instructions for executing the solutions of this application. In this case, the processor 2401 does not need to read the program code or the instructions from the memory 2403.

The network interface 2404 may be an apparatus such as a transceiver, and is configured to communicate with another device or a communications network. The communications network may be an Ethernet, a radio access network (RAN), a wireless local area network (WLAN), or the like. In this embodiment of this application, the network interface 2404 may be configured to receive a packet sent by another node in a segment routing network, or may send a packet to another node in a segment routing network. The network interface 2404 may be an Ethernet interface, a fast Ethernet (FE) interface, a gigabit Ethernet (GE) interface, or the like.

During specific implementation, in an embodiment, the device 2400 may include a plurality of processors such as the processor 2401 and a processor 405 in FIG. 24. Each of the processors may be a single-core (single-CPU) processor, or may be a multi-core (multi-CPU) processor. The processor herein may be one or more devices, circuits, and/or processing cores configured to process data (for example, computer program instructions).

Figure 25:
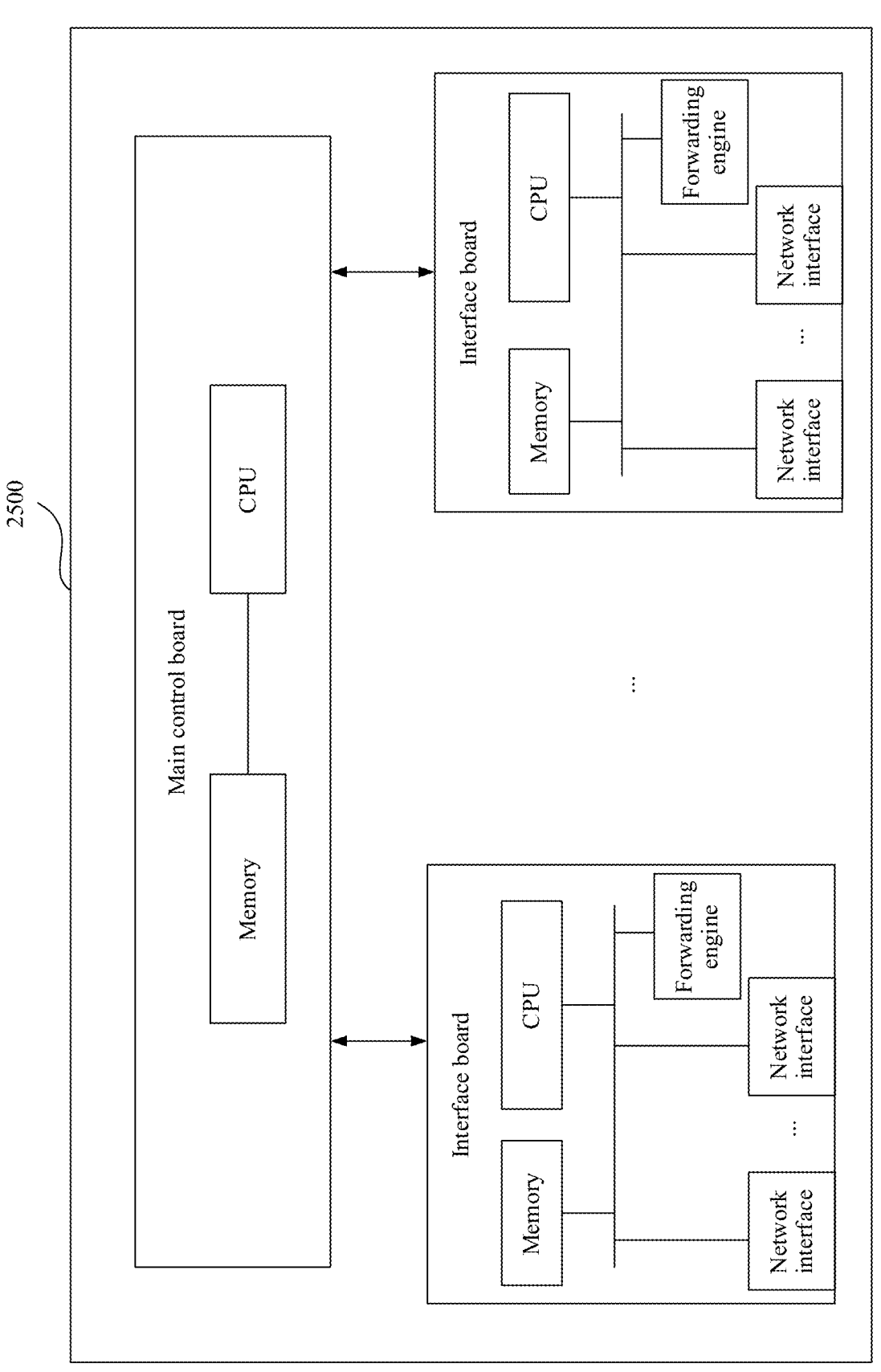
FIG. 25 is a schematic diagram of a structure of a device 2500 according to an embodiment of this application.

FIG. 25 is a schematic diagram of a structure of a device 2500 according to an embodiment of this application. The first network device and the second network device in FIG. 5 may be implemented by using the device shown in FIG. 25. Refer to the schematic diagram of the structure of the device shown in FIG. 25. The device 2500 includes a main control board and one or more interface boards. The main control board is communicatively connected to the interface board. The main control board is also referred to as a main processing unit (main processing unit, MPU) or a route processor card. The main control board includes a CPU and a memory, and is responsible for controlling and managing each component in the device 2500, including route computation, and device management and maintenance functions. The interface board is also referred to as a line processing unit (LPU) or a line card), and is configured to receive and send a packet. In some embodiments, the main control board communicates with the interface board through a bus, or the interface boards communicate with each other through a bus. In some embodiments, the interface boards communicate with each other through a switching board. In this case, the device 2500 also includes a switching board. The switching board is communicatively connected to the main control board and the interface boards, and is configured to forward data between the interface boards. The switching board may also be referred to as a switch fabric unit (SFU). The interface board includes a CPU, a memory, a forwarding engine, and an interface card (IC). The interface card may include one or more network interfaces. The network interface may be an Ethernet interface, an FE interface, a GE interface, or the like. The CPU is communicatively connected to the memory, the forwarding engine, and the interface card. The memory is configured to store a forwarding information table. The forwarding engine is configured to forward a received packet based on the forwarding information table stored in the memory. If a destination address of the received packet is an IP address of the device 2500, the forwarding engine sends the packet to the CPU of the main control board or the CPU of the interface board for processing. If a destination address of the received packet is not an IP address of the device 2500, the forwarding engine searches the forwarding information table based on the destination address. If a next hop and an outbound interface that correspond to the destination address are found from the forwarding information table, the forwarding engine forwards the packet to the outbound interface corresponding to the destination address. The forwarding engine may be a network processor (NP). The interface card, also referred to as a subcard, may be installed on the interface board. The interface card is responsible for converting an optical/electrical signal into a data frame, checking validity of the data frame, and forwarding the data frame to the forwarding engine for processing or the CPU of the interface board. In some embodiments, the CPU may also perform a function of the forwarding engine, for example, implementing software forwarding based on a general-purpose CPU, so that no forwarding engine is required in the interface board. In some embodiments, the forwarding engine may be implemented by using an ASIC or a field programmable gate array (FPGA). In some embodiments, the memory that stores the forwarding information table may alternatively be integrated in the forwarding engine, and is used as a part of the forwarding engine.

An embodiment of this application further provides a chip system, including a processor. The processor is coupled to a memory, and the memory is configured to store a program or instructions. When the program or the instructions are executed by the processor, the chip system is enabled to implement the method of the first network device or the second network device in the embodiment shown FIG. 5.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory. Optionally, there may also be one or more memories in the chip system. The memory may be integrated with the processor, or may be separated from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not limited in this application.

For example, the chip system may be an FPGA, an ASIC, a system on chip (SoC), a CPU, an NP, a digital signal processor (DSP), a micro controller unit (MCU), a programmable logic device (PLD), or another integrated chip.

It should be understood that operations in the foregoing method embodiments may be implemented by using a hardware integrated logical circuit in the processor, or by using instructions in a form of software. The operations of the method disclosed with reference to embodiments of this application may be directly performed by a hardware processor, or may be performed by using a combination of hardware in the processor and a software module.

An embodiment of this application further provides a computer-readable storage medium, including instructions. When the instructions are run on a computer, the computer is enabled to perform the methods in the embodiments of this application.

In the specification, claims, and accompanying drawings of this application, the terms "first", "second", "third", "fourth", and the like are intended to distinguish similar objects but do not need to be used to describe a specific order or sequence. It should be understood that the data termed in such a way are interchangeable in proper circumstances, so that embodiments described herein can be implemented in other orders than the order illustrated or described herein. In addition, the terms "include" and "have" and any other variants are intended to cover the non-exclusive inclusion. For example, a process, method, system, product, or device that includes a list of operations or units is not necessarily limited to those expressly listed operations or units, but may include other operations or units not expressly listed or inherent to such a process, method, product, or device.

In this application, "at least one" means one or more, and "a plurality of" means two or more. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural. In this application, it is considered that "A and/or B" includes only A, only B, and A and B.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical module division. During actual implementation, there may be another division manner. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be obtained depending on an actual requirement to implement the objectives of the solutions in the embodiments.

In addition, module units in embodiments of this application may be integrated into one processing unit. Alternatively, each of the units may exist alone physically, or at least two units are integrated into one unit. The integrated unit may be implemented in a form of hardware, or may be implemented in a form of a software module unit.

When the integrated unit is implemented in a form of a software module unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the operations of the methods in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

Persons skilled in the art should be aware that in the foregoing one or more examples, functions described in the present disclosure may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a special-purpose computer.

In the foregoing specific implementations, the objectives, technical solutions, and beneficial effects of the present disclosure are further described in detail. It should be understood that the foregoing descriptions are merely specific implementations of the present disclosure.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A method for sending packets, comprising:
obtaining, by a first network device, a first packet destined for a destination device;
adding, by the first network device, a first indication identifier to the first packet to generate a second packet, wherein the first indication identifier is used to indicate a second network device to avoid using a backup forwarding path from the second network device to the destination device to send the second packet to the destination device, wherein the backup forwarding path passes through the first network device, and wherein the adding, by the first network device, the first indication identifier to the first packet to generate the second packet comprises:
adding, by the first network device, a segment routing header (SRH) to the first packet to generate the second packet, wherein the first indication identifier is carried in the SRH; and
sending, by the first network device, the second packet to the second network device by using a first forwarding path.

2. The method according to claim 1, wherein the first forwarding path is a backup forwarding path from the first network device to the destination device, and before sending the second packet to the second network device using the first forwarding path, the method further comprises:
determining, by the first network device, that a second forwarding path to the destination device is unreachable, wherein the second forwarding path is a primary forwarding path from the first network device to the destination device.

3. The method according to claim 2, wherein the first packet comprises an Internet protocol (IP) address of the destination device, the first forwarding path is corresponding to a summary route from the first network device to the destination device, the second forwarding path is corresponding to a specific route from the first network device to the destination device, and wherein the determining, by the first network device, that the second forwarding path to the destination device is unreachable comprises:
failing, by the first network device, to obtain the specific route to the destination device through matching based on the IP address of the destination device; or
obtaining, by the first network device, the specific route to the destination device through matching based on the IP address of the destination device, and determining that the second forwarding path corresponding to the specific route is unreachable.

4. The method according to claim 1, wherein the first indication identifier is carried in a flags field, a tag field, or a type length value (TLV) of the SRH.

5. The method according to claim 1, wherein the SRH comprises a segment identifier list, and the segment identifier list comprises the first indication identifier.

6. The method according to claim 5, wherein the segment identifier list comprises a segment identifier of the second network device; and a locator part of the segment identifier of the second network device comprises the first indication identifier, or a function part of the segment identifier of the second network device comprises the first indication identifier.

7. The method according to claim 2, wherein the first packet comprises a label of the destination device, the first forwarding path is a forwarding path corresponding to backup forwarding information in a label forwarding entry corresponding to the label of the destination device, and the determining, by the first network device, that a second forwarding path to the destination device is unreachable comprises:
obtaining, by the first network device, the label forwarding entry through matching based on the label of the destination device, and
determining that the second forwarding path corresponding to primary forwarding information in the label forwarding entry is unreachable.

8. The method according to claim 1, wherein before the sending, by the first network device, the second packet to the second network device using the first forwarding path, the method further comprises:

receiving, by the first network device, a third packet from the second network device, wherein the third packet comprises an identifier of the second network device and a second indication identifier that is used to identify that the second network device supports a capability of avoiding using a backup path to forward a packet; and generating, by the first network device, based on the second indication identifier, a forwarding entry corresponding to the first forwarding path having an identifier of the destination device and forwarding information corresponding to the first forwarding path, the forwarding information comprises a label stack or a segment identifier list, the label stack or the segment identifier list comprises the identifier of the second network device, and the identifier of the second network device comprises a segment identifier of the second network device or a label of the second network device.

9. The method according to claim 8, wherein the third packet comprises an endpoint segment identifier type length value (End SID TLV) field, and the End SID TLV comprises the second indication identifier.

10. The method according to claim 8, wherein the third packet comprises a prefix segment identifier type length value (prefix SID TLV) field, and the prefix SID TLV field comprises the second indication identifier.

11. The method according to claim 1, wherein the first packet is from a third network device, the third network device belongs to a first network domain, and the destination device belongs to a second network domain.

12. The method according to claim 1, wherein a first network domain is an area of a backbone network, a second network domain is an area of an access network, the first network device is a network device connected to the access network and the backbone network, and the first forwarding path is a forwarding path in the backbone network.

13. A method for sending packets, comprising:

receiving, by a second network device, a first packet destined for a destination device, wherein the first packet is from a first network device, and the first packet comprises a first indication identifier, wherein a segment routing header (SRH) is added to the first packet, and wherein the first indication identifier is carried in the SRH;

determining, by the second network device, that a primary forwarding path from the second network device to the destination device is unreachable; and in response to determining that the primary forwarding path is unreachable, avoiding, by the second network device based on an indication of the first indication identifier, using a backup forwarding path to send the first packet to the destination device, wherein the backup forwarding path is a path from the second network device to the destination device, and wherein the backup forwarding path passes through the first network device.

14. The method according to claim 13, wherein the first packet comprises an Internet protocol (IP) address of the destination device, the primary forwarding path is corresponding to a summary route from the second network device to the destination device, the backup forwarding path is associated with the summary route, and wherein the determining, by the second network device, that the primary forwarding path from the second network device to the destination device is unreachable comprises:

obtaining, by the second network device, the summary route through matching based on the IP address of the destination device, and determining that the primary forwarding path of the summary route is unreachable.

15. The method according to claim 13, wherein the first packet comprises an IP address of the destination device, the primary forwarding path is corresponding to a specific route from the second network device to the destination device, the backup forwarding path is a forwarding path corresponding to a summary route from the second network device to the destination device, and wherein the determining, by the second network device, that the primary forwarding path from the second network device to the destination device is unreachable comprises:

failing, by the second network device, to obtain the specific route through matching based on the IP address of the destination device; or obtaining, by the second network device, the specific route through matching based on the IP address of the destination device, and determining that the forwarding path corresponding to the specific route is unreachable.

16. The method according to claim 13, wherein the first packet is a segment routing over Internet version 6 (SRv6) packet, and a segment routing header (SRH) of the SRv6 packet comprises the first indication identifier.

17. A network device operating as a first network device, comprising:

a memory comprising instructions;

a processor coupled to the memory, wherein when the instructions are executed by the processor, the instructions cause the network device to:

obtain a first packet destined for a destination device, add a first indication identifier to the first packet to generate a second packet, wherein the first indication identifier is used to indicate a second network device to avoid using a backup forwarding path from the second network device to the destination device to send the second packet to the destination device, wherein the backup forwarding path passes through the first network device, and wherein, to add the first indication identifier to the first packet to generate the second packet, the instructions, when executed by the processor, cause the network device to:

add a segment routing header (SRH) to the first packet to generate the second packet, wherein the first indication identifier is carried in the SRH, and send the second packet to the second network device by using a first forwarding path, wherein the first network device and the second network device are part of a network system having a plurality of network devices.

18. The network device according to claim 17, wherein the first forwarding path is a backup forwarding path from the first network device to the destination device; and the instructions further cause the network device to: prior to the sending the second packet to the second network device by using the first forwarding path, determine that a second forwarding path to the destination device is unreachable, wherein the second forwarding path is a primary forwarding path from the first network device to the destination device.

19. The network device according to claim 18, wherein the first packet comprises an Internet protocol (IP) address of the destination device, the first forwarding path is a forwarding path corresponding to a summary route from the first network device to the destination device, the second forwarding path is a forwarding path corresponding to a specific route from the first network device to the destination device, and the instructions further cause the network device to:

fail to obtain the specific route to the destination device through matching based on the IP address of the destination device; or obtain the specific route to the destination device through matching based on the IP address of the destination device, and determines that the second forwarding path corresponding to the specific route is unreachable.

20. The network device according to claim 18, wherein the first packet comprises a label of the destination device, the first forwarding path is a forwarding path corresponding to backup forwarding information in a label forwarding entry corresponding to the label of the destination device, and to determine that a second forwarding path to the destination device is unreachable, the instructions further cause the network device to:

obtain the label forwarding entry through matching based on the label of the destination device, and determine that the second forwarding path corresponding to primary forwarding information in the label forwarding entry is unreachable.

21. The network device according to claim 17, wherein the first indication identifier is carried in a flags field, a tag field, or a type length value (TLV) of the SRH.

22. The network device according to claim 17, wherein the SRH comprises a segment identifier list, and the segment identifier list comprises the first indication identifier.

23. The network device according to claim 22, wherein the segment identifier list comprises a segment identifier of the second network device; and a locator part of the segment identifier of the second network device comprises the first indication identifier, or a function part of the segment identifier of the second network device comprises the first indication identifier.

24. The network device according to claim 17, wherein to send the second packet to the second network device using the first forwarding path, the instructions further cause the network device to:

receive a third packet from the second network device, wherein the third packet comprises an identifier of the second network device and a second indication identifier that is used to identify that the second network device supports a capability of avoiding using a backup path to forward a packet; and generate based on the second indication identifier, a forwarding entry corresponding to the first forwarding path having an identifier of the destination device and forwarding information corresponding to the first forwarding path, the forwarding information comprises a label stack or a segment identifier list, the label stack or the segment identifier list comprises the identifier of the second network device, and the identifier of the second network device comprises a segment identifier of the second network device or a label of the second network device.

25. The network device according to claim 24, wherein the third packet comprises an endpoint segment identifier type length value (End SID TLV) field, and the End SID TLV comprises the second indication identifier.

26. A network device operating as a second network device, comprising:

a memory comprising instructions;

a processor coupled to the memory, wherein when the instructions is executed by the processor, the instructions cause the network device to:

receive a first packet destined for a destination device, wherein the first packet is from a first network device, and the first packet comprises a first indication identifier, wherein a segment routing header (SRH) is added to the first packet, and wherein the first indication identifier is carried in the SRH;

determine that a primary forwarding path from a second network device to the destination device is unreachable, wherein the first network device and the second network device are part of a network system having a plurality of network devices; and in response to determining that the primary forwarding path is unreachable, avoid, based on the first indication identifier, using a backup forwarding path to send the first packet to the destination device, wherein the backup forwarding path is a path from the second network device to the destination device, and wherein the backup forwarding path passes through the first network device.

27. The network device according to claim 26, wherein the first packet comprises an Internet protocol (IP) address of the destination device, the primary forwarding path is a primary forwarding path corresponding to a summary route from the second network device to the destination device, the backup forwarding path is a backup forwarding path of the summary route, and the instructions further cause the network device to:

obtain the summary route through matching based on the IP address of the destination device, and determine that the primary forwarding path of the summary route is unreachable.

28. The network device according to claim 26, wherein the first packet comprises an IP address of the destination device, the primary forwarding path is a forwarding path corresponding to a specific route from the second network device to the destination device, the backup forwarding path is a forwarding path corresponding to a summary route from the second network device to the destination device, and the instructions further cause the network device to:

fail to obtain the specific route through matching based on the IP address of the destination device; or obtain the specific route through matching based on the IP address of the destination device, and determine that the forwarding path corresponding to the specific route is unreachable.

29. The network device according to claim 26, wherein the first packet is a segment routing over Internet version 6 (SRv6) packet, and a segment routing header (SRH) of the SRv6 packet comprises the first indication identifier.

30. The network device according to claim 29, wherein the instructions further cause the network device to:

prior to the determining that the primary forwarding path to the destination device is unreachable, determine that a destination address of the SRv6 packet is an IP address of the second network device, obtain an identifier of the destination device from a segment identifier list of the SRv6 packet, modify the destination address of the SRv6 packet to the identifier of the destination device, and determine, based on the destination address of the SRv6 packet, that the primary forwarding path to the destination device is unreachable.

* * * * *